United States Patent [19]

Searle et al.

[11] Patent Number: 5,714,957
[45] Date of Patent: Feb. 3, 1998

[54] BASE STATION ANTENNA ARRANGEMENT

[75] Inventors: Jeffrey Graham Searle, Galmpton, Great Britain; Stuart James Dean, Nepean, Canada

[73] Assignee: Northern Telecom Limited, Montreal, Canada

[21] Appl. No.: 441,777

[22] Filed: May 16, 1995

Related U.S. Application Data

[62] Division of Ser. No. 289,920, Aug. 12, 1994.

[30] Foreign Application Priority Data

Aug. 12, 1993 [GB] United Kingdom ............... 9316828

[51] Int. Cl.$^6$ ............................................... H01Q 3/02
[52] U.S. Cl. ......................... 342/374; 342/373; 342/81; 342/154
[58] Field of Search .................... 342/374, 373, 342/81, 154, 372

[56] References Cited

U.S. PATENT DOCUMENTS

| | | | |
|---|---|---|---|
| 3,979,754 | 9/1976 | Archer | 343/754 |
| 4,489,325 | 12/1984 | Bauck et al. | 343/374 |
| 4,626,858 | 12/1986 | Copeland | 342/374 |
| 5,017,927 | 5/1991 | Agrawal et al. | 342/371 |
| 5,166,690 | 11/1992 | Carlson et al. | 342/157 |
| 5,276,452 | 1/1994 | Schuss et al. | 342/371 |
| 5,434,575 | 7/1995 | Jelinek et al. | 342/365 |

*Primary Examiner*—Thomas H. Tarcza
*Assistant Examiner*—Dao L. Phan
*Attorney, Agent, or Firm*—Lee, Mann, Smith, McWilliams, Sweeney & Ohlson

[57] ABSTRACT

An antenna for a base station comprising a plurality of antenna arrays (40; FIG. 6a) each capable of forming a multiplicity of separate overlapping narrow beams in azimuth, the arrays being positioned such that the beams formed by the arrays provide a coverage in azimuth wider than each array. Means are provided for splitting (58; FIGS. 14b,14c) the transmission output of a given transceiver into two signals prior to transmission power amplification and transmitting said signals in two adjacent narrow overlapping beams.

8 Claims, 17 Drawing Sheets

OMNI-DIRECTIONAL CONFIGURATION
(N = 7 RE-USE FACTOR)

1st TIER RE-USE CELLS

TYPICAL TRI-SECTORED CONFIGURATION
(N = 7 RE-USE FACTOR)

1st TIER RE-USE CELL NON-INTERFERING

TYPICAL HEX-SECTORED CONFIGURATION
(N = 7 RE-USE FACTOR)

Fig. 14 (a) INPHASE
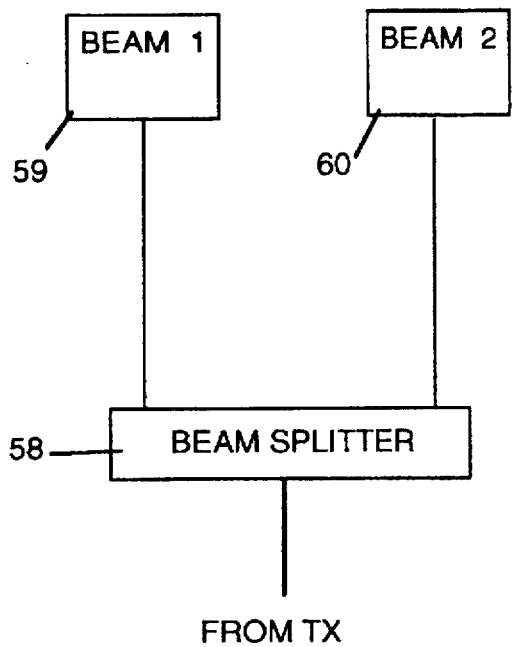
Fig. 14 (b) QUADRATURE
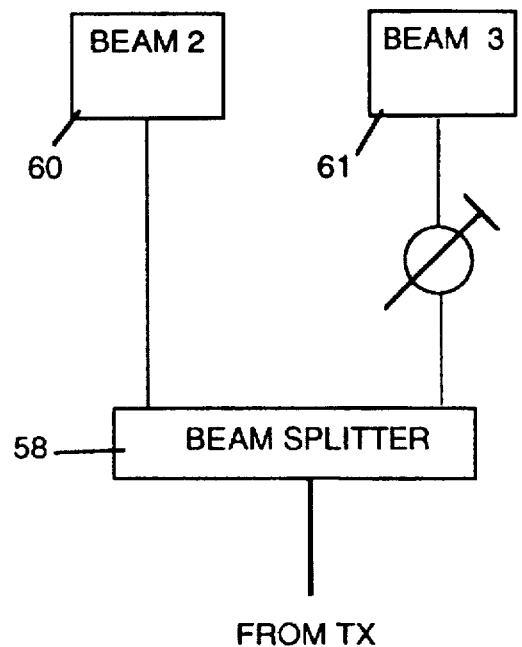
Fig. 14 (c)
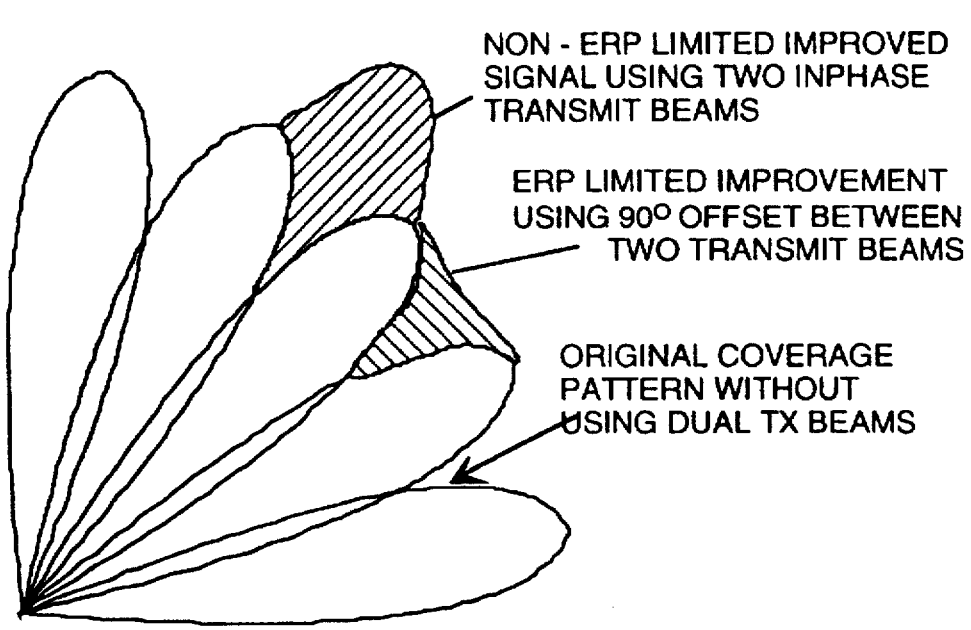

NARROW OVERLAPPING BEAMS

SELECTED BEAMS AT TIME t1

SELECTED BEAMS
AT TIME t2

| MOBILE CHANNEL ALLOCATION | BEAM NUMBER SELECTED ||
|---|---|---|
| | TIME t1 | TIME t2 |
| ms1 ALLOCATED CHANNEL 1 | B17 | B18 |
| ms2 ALLOCATED CHANNEL 2 | B2 | HANDED OFF TO ADJACENT CELL |
| ms3 ALLOCATED CHANNEL 3 | B2 | B4 |
| ms4 ALLOCATED CHANNEL 4 | B8 | B7 |

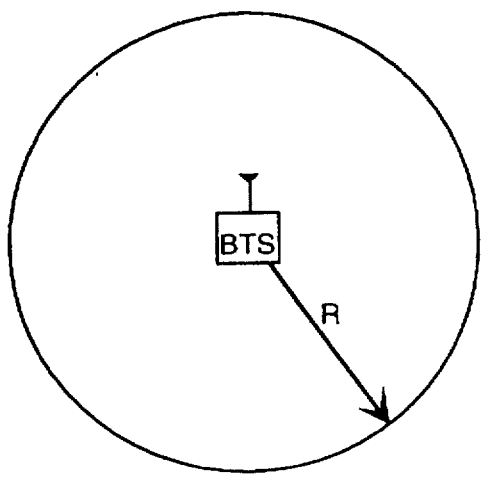
Fig. 17 (a)
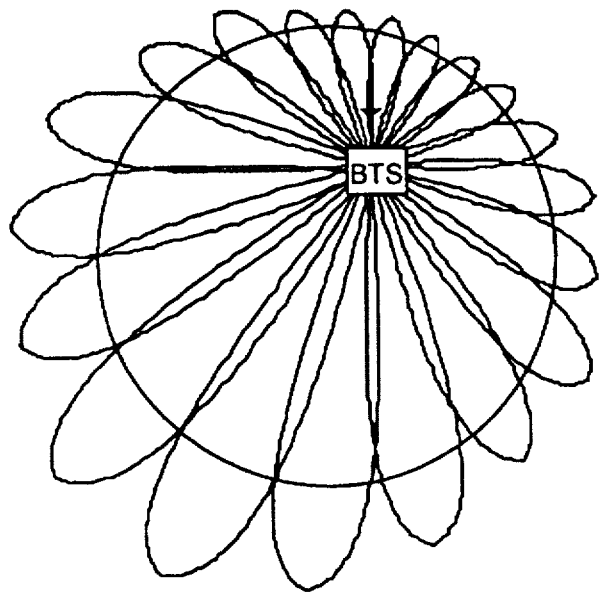
Fig. 17 (b)
Fig. 18
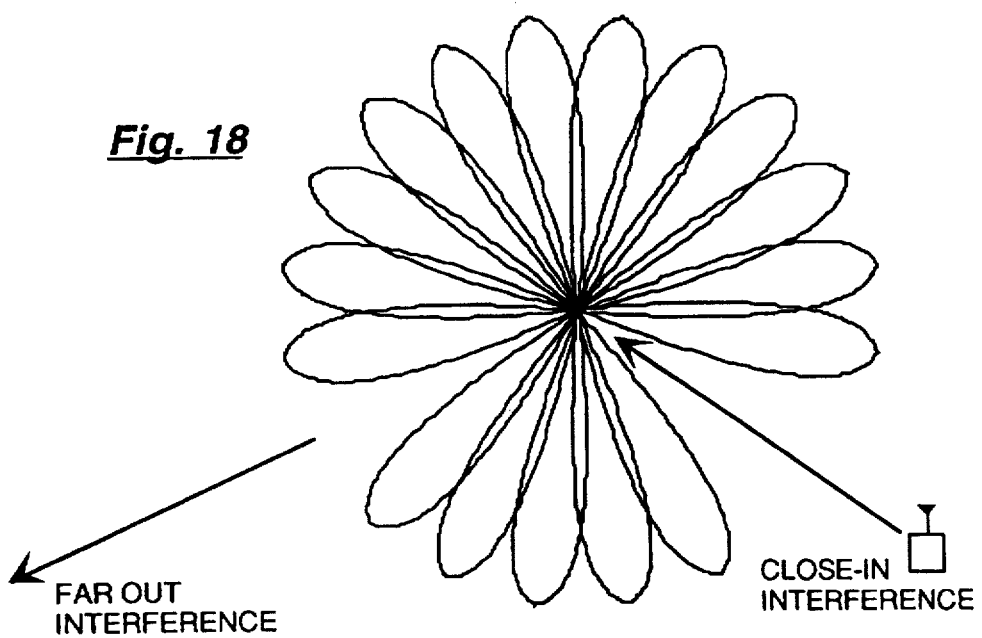

BASE STATION ANTENNA ARRANGEMENT

RELATED APPLICATIONS

This application is a division of U.S. patent application Ser. No. 08/289,920, filed Aug. 12 1994.

BACKGROUND OF THE INVENTION

This invention relates to a base station antenna arrangement, for use in a Cellular Radio communications system, which shall hereafter be referred to as a smart antenna.

TECHNICAL FIELD

Cellular radio systems are currently in widespread use throughout the world providing telecommunications to mobile users. In order to meet the capacity demand, within the available frequency band allocation, cellular radio systems divide a geographic area to be covered into cells. At the centre of each cell is a base station, through which the mobile stations communicate. The available communication channels are divided between the cells such that the same group of channels are reused by certain cells. The distance between the reused cells is planned such that the co-channel interference is maintained at a tolerable level.

When a new cellular radio system is initially deployed, operators are often interested in maximising the uplink (mobile station to base station) and downlink (base station to mobile station) range. The ranges in many systems are uplink limited due to the relatively low transmitted power levels of hand portable mobile stations. Any increase in range means that less cells are required to cover a given geographic area, hence reducing the number of base stations and associated infrastructure costs.

When a cellular radio system is mature the capacity demand can often increase, especially in cities, to a point where more, smaller size cells are needed in order to meet the required capacity per unit area. The process used to create these smaller cells is known as cell splitting. Any technique that can provide additional capacity without the need for cell-splitting will again reduce the number of base station sites and associated infrastructure costs.

The antenna used at the base station site can potentially make significant improvements to the range and capacity of a cellular radio system. The ideal base station antenna pattern is a beam of narrow angular width as shown in FIG. 1a. The narrow beam is directed at the wanted mobile, is narrow in both the azimuth and elevation planes, and tracks the mobile's movements. When compared to an omni-directional antenna, such a beam will have the dual benefits of having high gain, leading to increased range in thermal noise limited initial deployments, and rejecting interference from co-channel reuse cells allowing higher capacity without cell splitting in mature deployments. The narrow beam reduces interference in a balanced manner on the uplink and downlink. On the uplink the base station receiver is protected from interference generated by mobile station transmitters in the co-channel reuse cells, FIG. 1b. On the downlink the mobile is unlikely to be in the beams of the base station transmitters in the co-channel reuse cells. The extent of the advantage of a narrow beam antenna over an omni-directional antenna is a function of the beamwidth. The narrower the beamwidth the greater the advantage, but this must be traded off against the increased size and complexity of the antenna.

Although the narrow beam is formed at radio frequencies (typically in the 900 or 1800 MHz bands) it can usefully be visualised as analogous to a laser beam that emanates from the base station and tracks the mobiles. When contrasted with an omni-directional antenna, this clearly creates a high quality transmission path with minimal interference. For the purposes of this document the use of the word "omni" is intended to convey the meaning of having radiation coverage over the area corresponding to the required geographic area of the cell.

BACKGROUND ART

Some of the potential benefits of narrow beam antennas, for cellular radio, have been recognised in the literature, see for example "A Spectrum Efficient Cellular Base Station Antenna Architecture", S. C. Swales and M. A. Beach, Personal & Mobile Radio Communications Conference, Warwick, 1991 and "Proposed Advanced Base Station Antennas for Future Cellular Mobile Radio Systems", W. S. Davies, R. J. Long and E. Vinnal, Australian Telecomms Research, Vol. 22, No. 1, pp 53–60. Within current systems the manner in which directive antennae are used allows relatively small benefits to be obtained. The use of directive antennas in current cellular radio systems is based on the principle of sectorisation as illustrated in FIG. 2. The main sources of interference, in a cellular system, come from the so called first tier reuse cells. An omni-directional base station antenna will receive interference from all six first tier reuse cells, FIG. 2a. If an antenna with nominally 120° beamwidth is used, corresponding to a tri-sectored configuration, interference will be received from only two first tier reuse cells, FIG. 2b. If an antenna with 60° beamwidth is used, corresponding to a hex-sectored configuration, interference will be received from only one of the first tier cells, FIG. 2c. In sectorised cells the cellular radio transceivers at the base station are only connected to one sector (or antenna) and cannot be used in other sectors within the same cell.

The sectorised approach to the use of directive antennas has reached its useful limit at 60° beamwidth and can go no further. There are two key disadvantages of the approach:

a) The cellular radio transceivers are dedicated to particular sectors that leads to significant levels of trunking inefficiency. In practice this means that many more transceivers are needed at the base station site than for an omni-directional cell of the same capacity.

b) Each sector is treated by the cellular radio network (i.e. the base station controller and mobile switches) as a separate cell. This means that as the mobile moves between sectors, a considerable interaction is required, between the base station and the network, to hand off the call, between sectors of the same base station. This interaction, comprising signalling and processing at the base station controller and switch, represents a high overhead on the network and reduces capacity.

A standard cellular radio system is comprised of several layers, as shown in FIG. 3. A Mobile Switching Centre (MSC) is the interface between the cellular system and other networks, e.g. PSTN, Public Switched Telephone Network or ISDN, Integrated Services Digital Network. Each MSC controls several Base Station Systems (BSS), which in some systems, such as GSM or PCS, are further divided into a Base Station Controller (BSC) which controls several Base Transceiver Stations (BTS). Each BSS communicates with several Mobile Stations (MS). At the MSC level there are also other facilities such as Operations and Maintenance (OMC) and Network Management (NMC).

In this system the calls are allocated to transceivers at baseband in the cellular radio network, at either the BSC, if available, or at the MSC, as shown in FIG. 4a. Any change required in the call to transceiver allocation has to be signalled through the network, maybe as far as the MSC and back again. This represents a heavy loading on the signalling network and a time delay whilst it occurs.

The basic concept of a smart antenna is disclosed in European Patent Application No. 92 309 520.2. A smart antenna as referred to hereinafter comprises a plurality of antenna arrays each capable of forming a multiplicity of separate overlapping narrow beams in azimuth, the arrays being positioned such that the totality of beams formed by the arrays provides a substantially omni-directional coverage in azimuth, azimuth and elevation beamforming means for each array, a plurality of r.f. transceivers each for transmitting and receiving r.f. signals for one or more calls, switching matrix means for connecting each transceiver with one or other of the arrays via the beamforming means, control means for controlling the switch matrix means whereby a particular transceiver is connected to a particular array, via the beamforming means, to exchange r.f. signals with a remote station located in the area covered by one of the narrow beams.

SUMMARY OF THE INVENTION

According to the present invention there is provided an antenna comprising:

a plurality of layered antenna arrays each capable of forming a multiplicity of separate overlapping narrow beams in azimuth, the arrays being positioned such that the beams provide a coverage in azimuth wider than each array; and means for splitting the transmission output of a given transceiver into two signals prior to transmission power amplification and transmitting said signals in two adjacent narrow overlapping beams. The signals can be substantially identical. Preferably the split signals are transmitted in quadrature in the two adjacent beams According to a further aspect of the invention the antenna includes:

azimuth beamforming means for each array;

a plurality of r.f. transceivers each for transmitting and receiving r.f. signals for one or more calls;

switching matrix means for connecting each transceiver with one or other of the arrays via the beamforming means; and control means for controlling the switch matrix means whereby a particular transceiver is connected to a particular array, via the beamforming means, to exchange r.f. signals with a remote station located in the area covered by one of the narrow overlapping beams;

BRIEF DESCRIPTION OF THE DRAWINGS

Embodiments of the invention will now be described with reference to the accompanying drawings, in which:

FIGS. 14a–14c are diagrams of different embodiments of the dual transmit beam system with an illustration of the relative radiation pattern improvements to be found, FIGS. 17a and 17b illustrate schematically the flexibility in base station location by the use of cell dimensioning, FIG. 18 illustrates schematically the use of cell dimensioning to reduce interference problems.

DESCRIPTION OF THE PREFERRED EMBODIMENTS

Figure 1A:
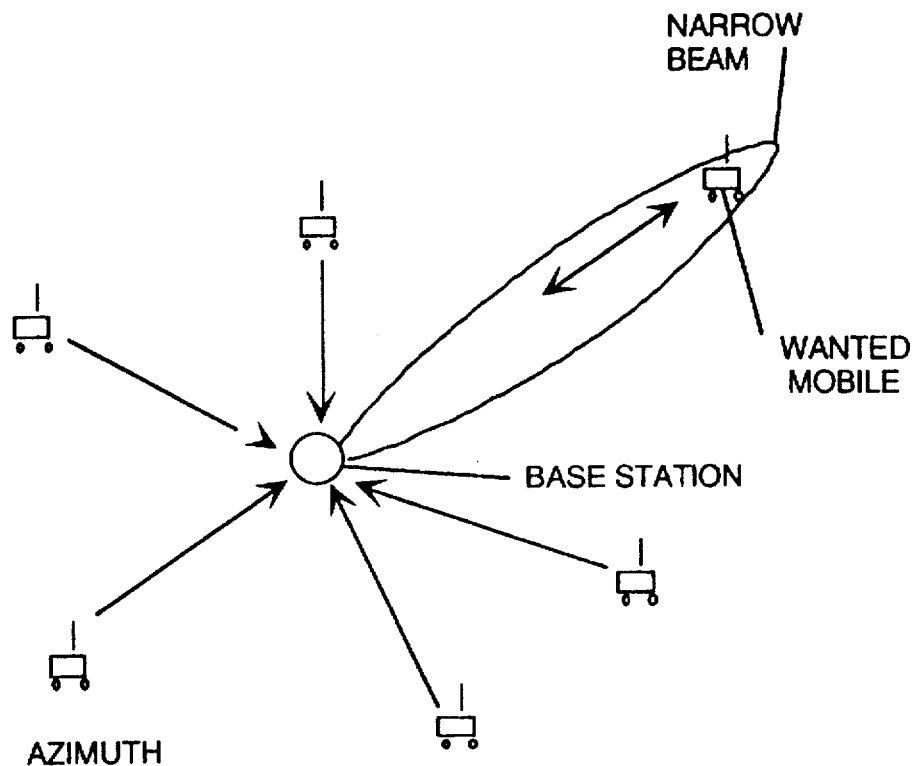
FIGS. 1a and 1b illustrate schematically the use of a narrow beam antenna to communicate between a base station and a mobile station.
Figure 1B:
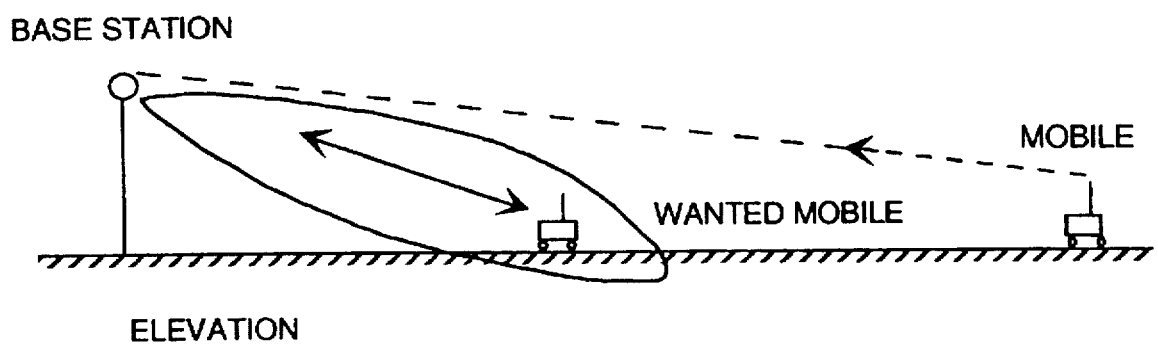
Figure 2:
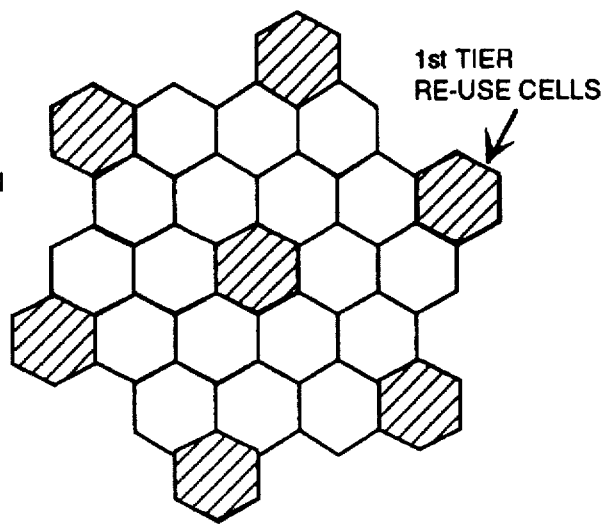
FIGS. 2a–2c illustrate schematically the principle of sectorisation of a base station.
Figure 2:
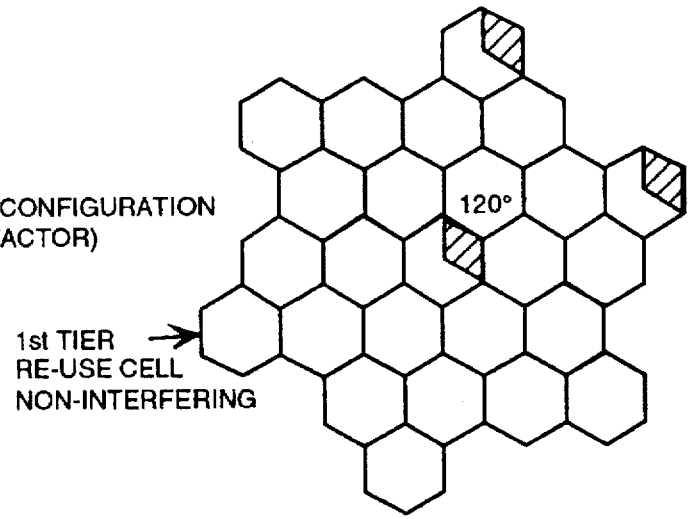
Figure 2C:
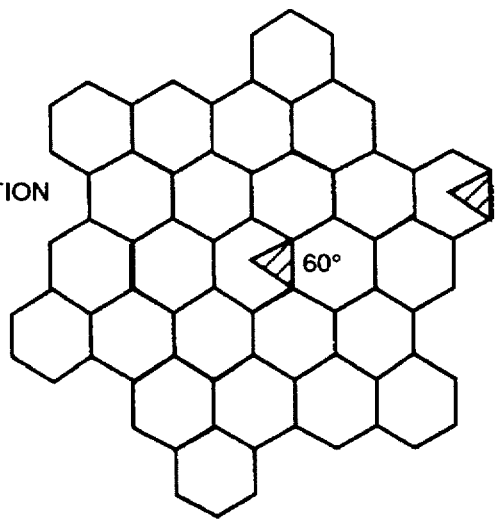
Figure 3:
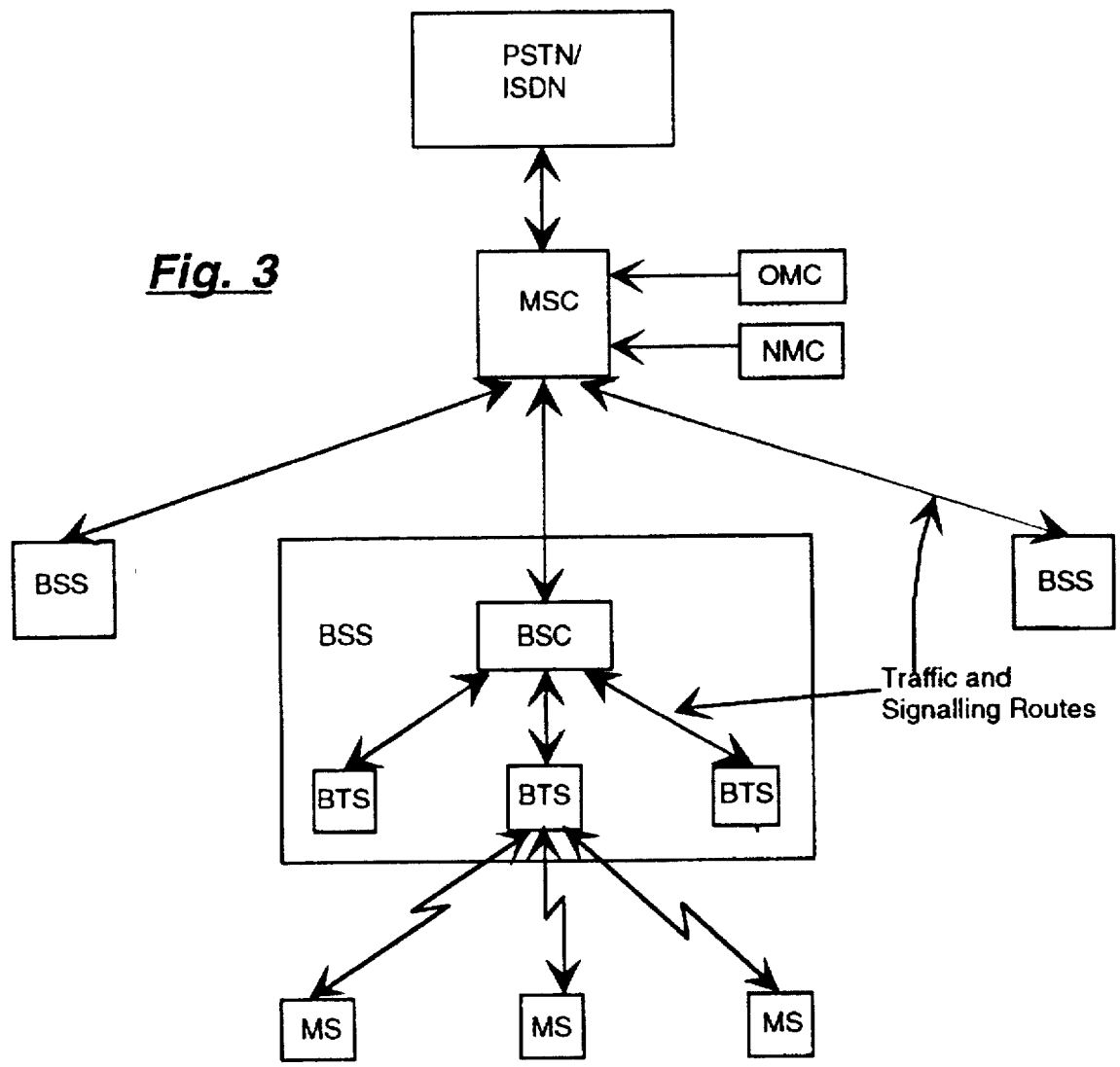
FIG. 3 is a block diagram of the main elements of a cellular system.
Figure 4:
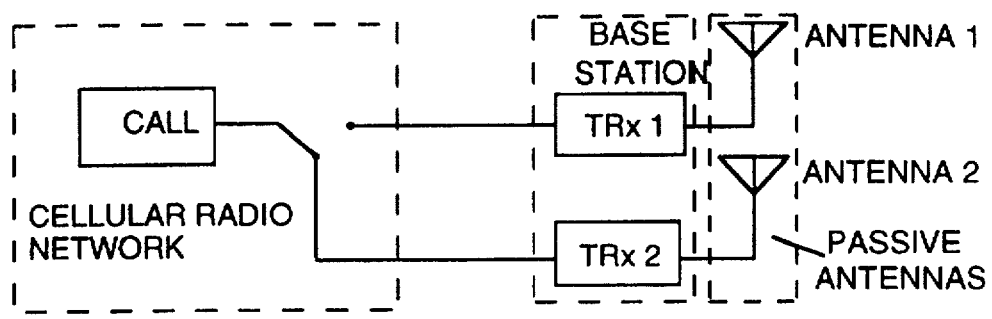
FIGS. 4a and 4b illustrate the differences in call handling between a conventional cellular system and one using a smart antenna.
Figure 4:
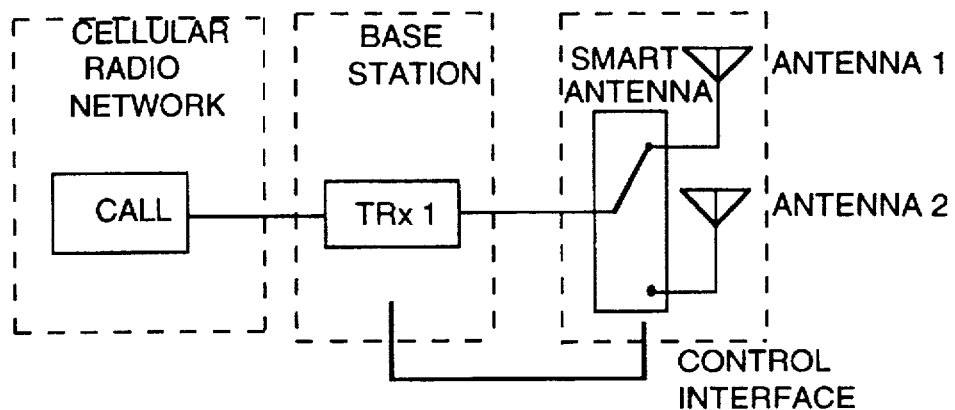
Figure 5:
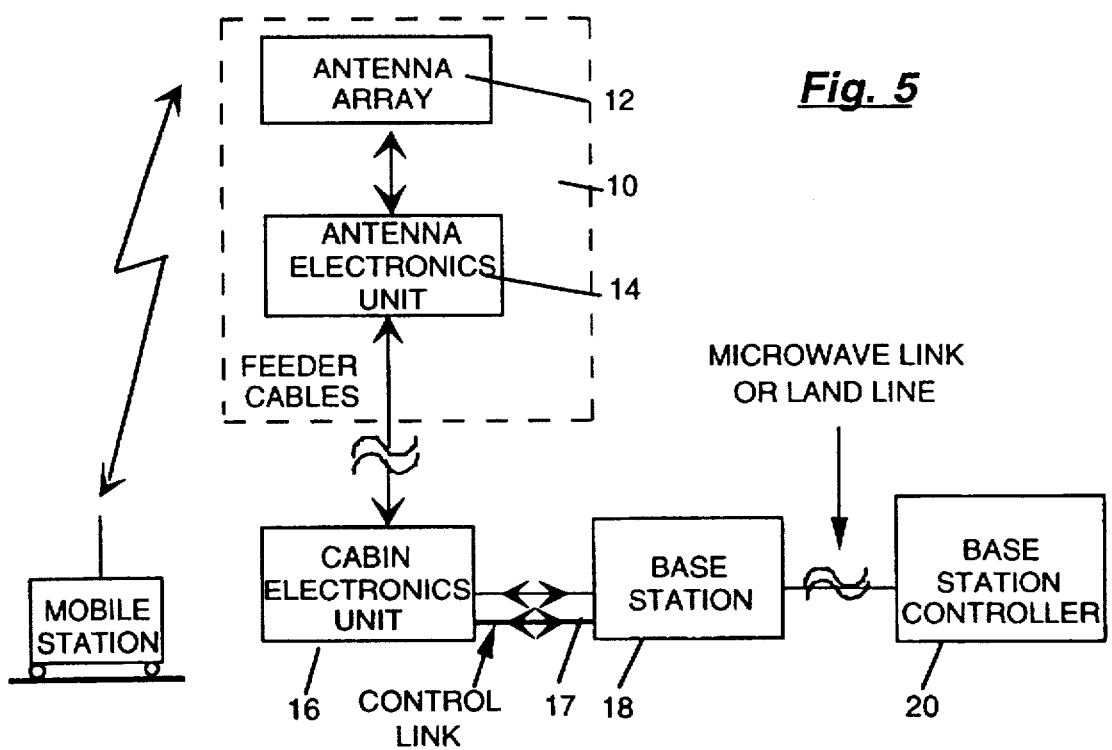
FIG. 5 is a block diagram of the main elements of a base station.

The main elements of a smart antenna as shown in FIG. 5 comprise a mast, tower or building 10 supporting the antenna array(s) 12 and associated antenna electronics unit 14, which includes beamformers, diplexers and amplifiers. The antenna electronics unit 14 is connected via a cabin electronics unit 16 to the base station 18 that is under the control of a base station controller 20. The smart antenna system replaces the conventional passive antenna normally attached to the base station. The use of electronics in the masthead allows the call switching to be carried out between the transceivers and antennas within the smart antenna, as shown in FIG. 4b. The switching now occurs on the r.f. signals and only requires local control from the attached base station. This requires a new interface link 17 to be established between the base station and the smart antenna system. The previous baseband information is no longer required, reducing the loading on the signalling through the cellular radio network. It is replaced by r.f. assignment information on the new interface link between the base station and smart antenna. This interface is also used to convey control information from the MSC, OMC and NMC parts of the cellular system.

Figure 6:
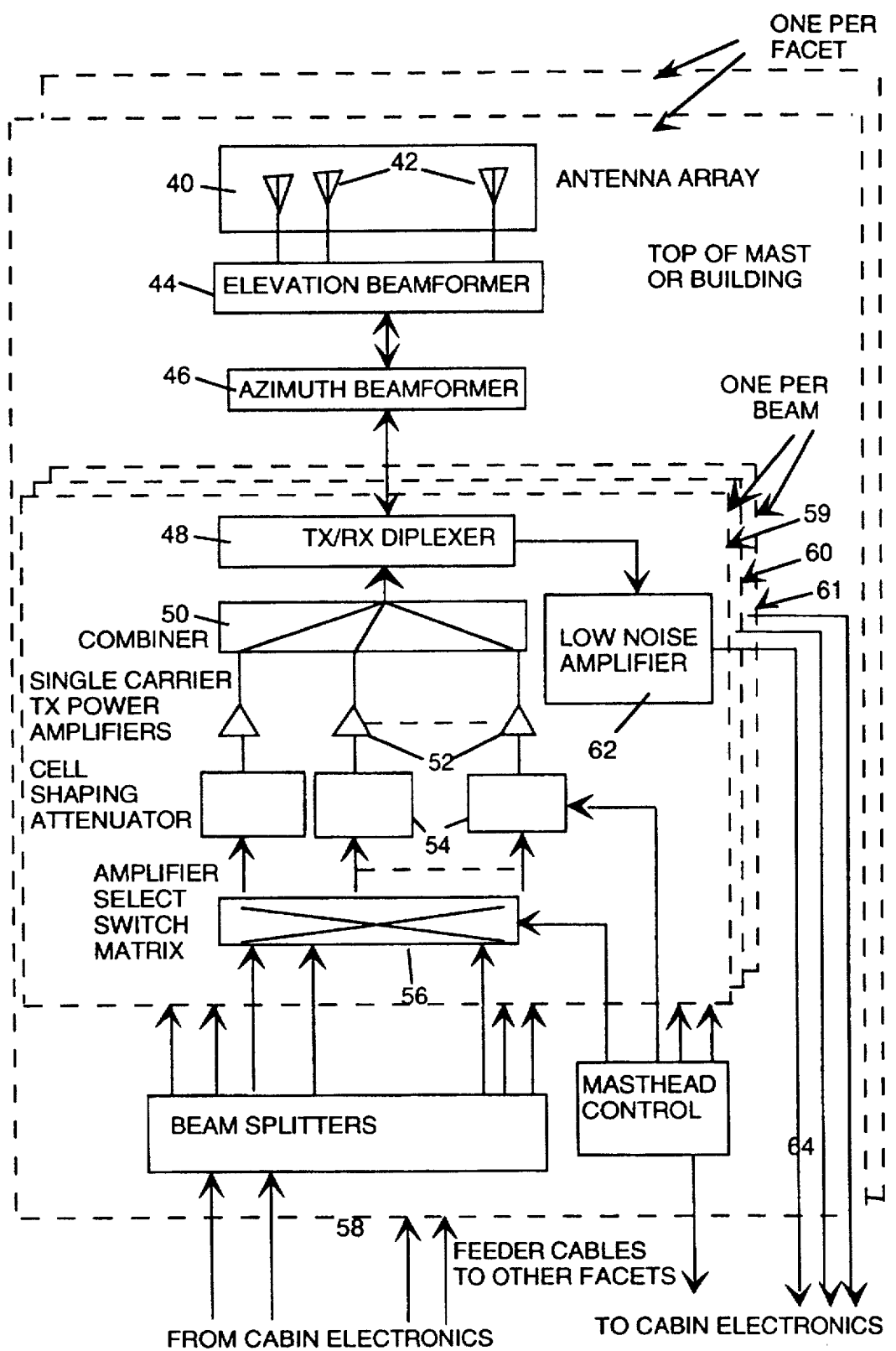
FIGS. 6a and 6b are diagrams of the constituents of a multiple narrow beam base station.
Figure 6:
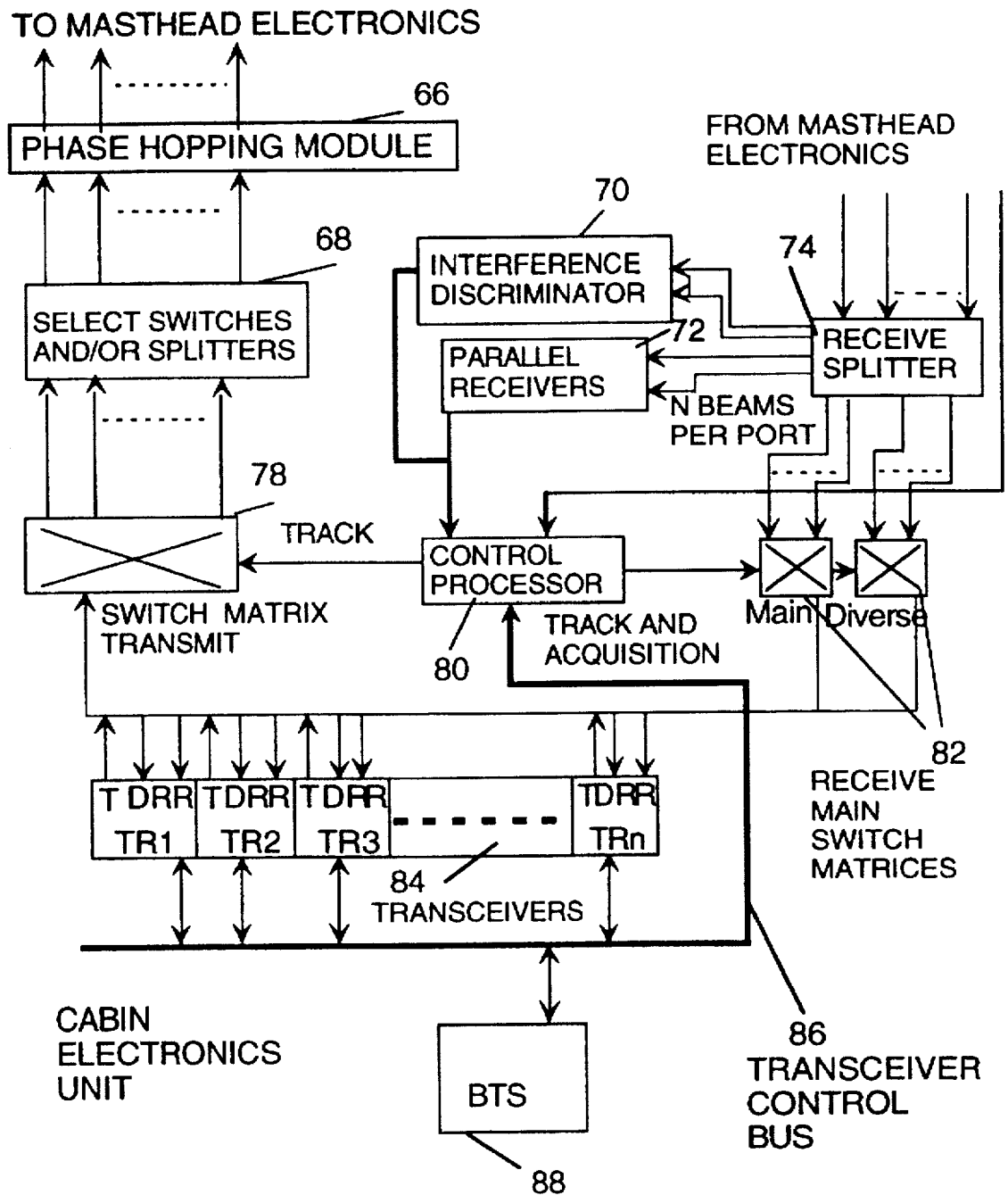

For the purposes of this description the term "base station network" is used to describe all parts of the cellular system prior to the smart antenna and its interface link, e.g. the radio, base station controller, mobile switching centre, operations and maintenance and network management. The detailed constituents of the smart antenna are shown in FIG. 6. The masthead antenna electronics is shown in FIG. 6a and the cabin electronics in FIG. 6b. Only one of the antenna arrays is depicted. Each antenna array 40 comprises a conventional array of individual antenna elements 42 arranged in rows and columns. Each column of elements is energised via an elevation beamforming network 44. Each elevation beamforming network combines the elements of a column to a single feed point. The amplitude and phase relationships of the r.f. signals coupled to the elevation beamformer determine the elevation beam pattern of the antenna for both transmit and receive. Each elevation beamformer is coupled to the azimuth beamformer 46. The azimuth beamformer has multiple ports for both transmit and receive, one for each elevation beamformer. The phase and amplitude relationship of the r.f. signals coupled to the elevation beamformers control the azimuth beam pattern for both transmit and receive. As the azimuth beamformer is prior to the low noise amplifiers on the receive path it must be optimised for low loss in that path. One well-known type of beamformer is the Butler matrix.

The transmit and receive signals for the azimuth beamformer are coupled to the beamformer via individual diplexers 48. Filters that cover just the transmit or receive frequency bands respectively can be used for this purpose. In the transmit path the diplexers 48 are fed via a combiner 50 from separate single carrier power amplifiers 52. These amplify the r.f. signals up to the power levels required for transmission. In the receive path the diplexers 48 feed separate substantially identical low noise amplifiers 62, one for each azimuth beam. The low noise amplifiers are required to amplify the weak received r.f. signals prior to any system losses to establish a low noise figure (high sensitivity) in the subsequent receive path.

In the receive path, signals are passed from the low noise amplifiers 62 to the receive splitter 74. On the transmit side, signals are passed to the single carrier transmit amplifiers 35 from cell shaping attenuators 54. There is one cell shaping attenuator per transmit amplifier. All attenuators in any one beam are set to the same value to give a new beam template across all frequencies. This sets the maximum range in a particular direction, however the power required to reach a particular mobile in the beam can be reduced from this if necessary. The attenuators are controlled by the operator via the masthead control electronics. The cell shaping attenuators are situated prior to the amplifiers, to enable low power standard attenuators to be used. By placing them prior to the combiner the intermodulation performance is improved, due to each being at a single frequency.

Signals are passed from the transceivers 84 to the cell shaping attenuators, by a switching system, via an optional phase hopping module 66. This ensures that all transmitters can be connected to any beamformer input, however only one transmitter is connected to any one of the single carrier power amplifiers, at any time. The switching system comprises several levels of switching or splitting, which ensures primarily maximum redundancy on the omni path and secondarily some redundancy in the traffic paths. The transceivers 84, if required can be input to an n*n transmit switch matrix 78, where n is equal to the number of transceivers. The transmit switch matrix allows any one input to be connected to any one output, but not more than one input to any one output simultaneously. This allows for redundancy should any cable in the mast fail, however the same function can be accomplished by the BTS if a suitable command interface exists. A combination of switches and splitters 56, 58, 68 is used to ensure that the omni path is routed to every beam, whilst a single traffic channel only goes to one beam. This switching and splitting function may be placed either at the top or the bottom of the mast or a combination of both as shown in FIG. 6. The preferred method is to have the main facet switches 68 at the bottom of the mast and then each transceiver path is split to every beam, via the beam splitter 58, where the amplifier select switch matrix 56 switches off the beams not required. This makes the implementation of the dual transmit beam concept far easier and ensures that the lower reliability components are in the cabin where access is easier.

Figure 7:
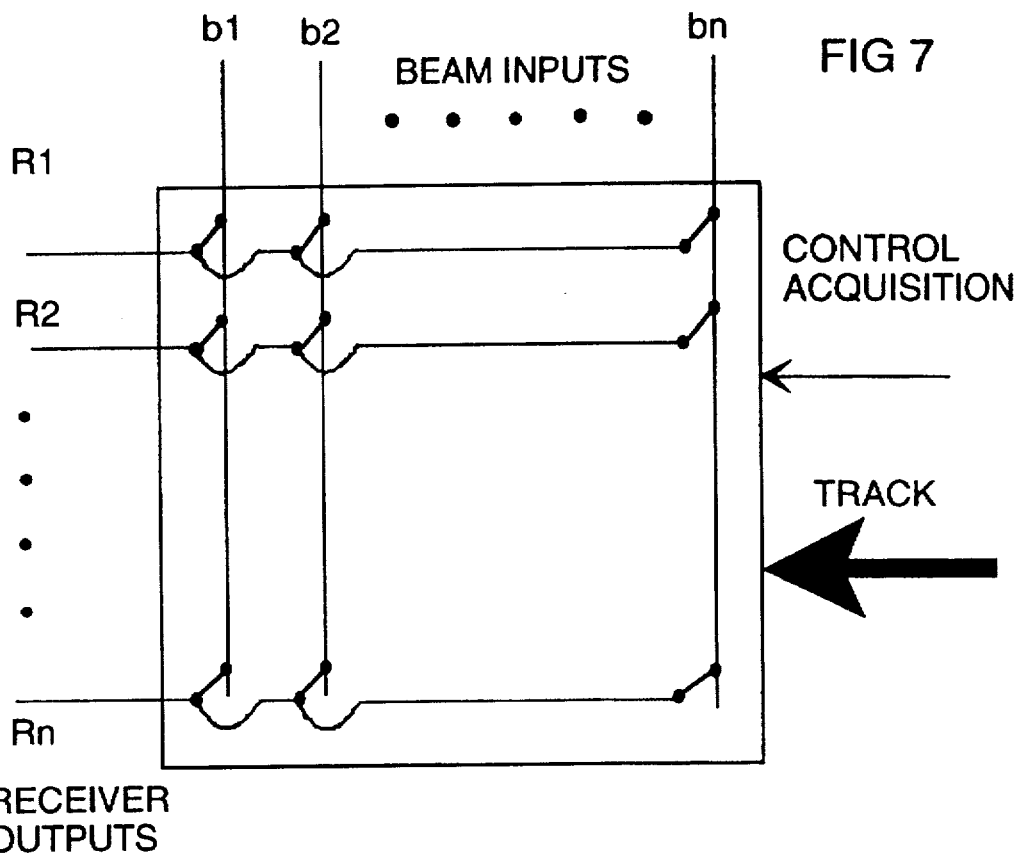
FIG. 7 illustrates the basic principle of a switching matrix.

The transmit, receive and amplifier select switch matrices comprise an r.f. cross-bar switch that allows any of its inputs to be connected to any of it's outputs. The switch matrix design is such that any number of transmitters or receivers can be connected simultaneously to any one beamformer port, thus, if necessary, all the transmitters can be connected to one beam port at a given time. Likewise all the receivers can be connected, if necessary, to the same beam port at the same time. In practice, should there be more transceivers than a single beam can handle, the number of transmitters that can be connected to the beam port is limited by the number of Tx power amplifiers 52. The switch matrices are operated under the control of a control processor 80. A typical switch matrix structure is illustrated in FIG. 7.

The receive splitter 74 ensures that all incoming signals, from each beam, are sent to the interference discriminator 70; the parallel receivers 72 and both the main and diverse receive switch matrices 82.

Figure 8:
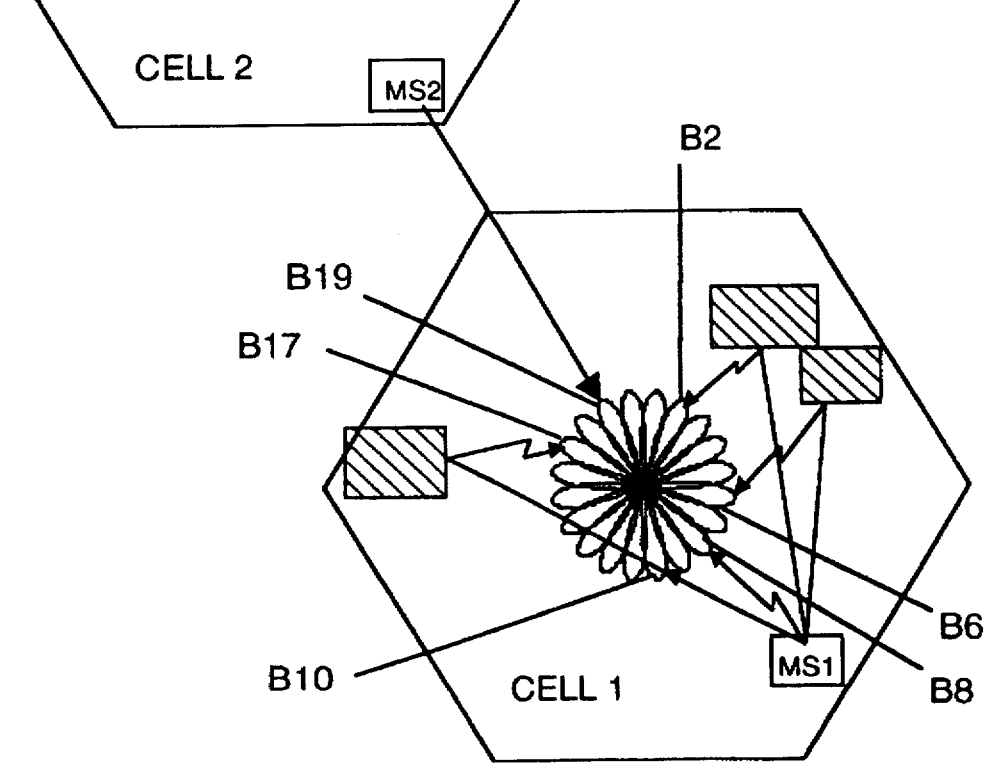
FIG. 8 illustrates schematically the use of an interference detector.

The interference discriminator 70 is used to identify whether or not the incoming signal is from a mobile in its own cell, or one of a nearby cell or any other spurious source. The parallel receivers only assess signal strength, however, one of the strongest signals may not be from a mobile within the cell, as shown by the direct path signal from MS2 in FIG. 8. If these errant signals are not identified, it can lead to errors in the processing within the base station. All transmissions between a mobile and a base station contain a fixed pattern known as a training sequence, every base station within a given area has its own unique training sequence. The interference discriminator selects one of the beams, in each timeslot, and searches for the training sequence within the received signal, usually using correlation techniques for digital signals. The beam that is selected is dictated by the control processor, based on information received from the receive switch matrices and the interference discriminator. It does not necessarily look at every beam, only those considered to be the most likely contenders. The use of an interference discriminator is one of the features of the smart antenna system which allows the frequency re-use number to be decreased.

A bank of parallel receivers 72, one for each beam, allow every receive channel to be monitored on every beam simultaneously. For each channel the receivers measure the quality of the wanted mobile signal present on each beam. The information on which is the 'best' beam is passed to the control processor. The quality measure used by the receivers will vary depending on the particular cellular system concerned. In simple cases the measure will be the highest power level in other cases carrier to interference ratio will be used.

The basic function of the control processor 80 is to control the transmit and receive switch matrices such that the best beam (normally the one pointing at the mobile stations geographic position) for a given channel is selected. The inputs to the control processor are the beam amplitude data from the parallel receivers and data from the control buses to the base station. The latter allow the control processor to monitor a given mobile station's assignment to various control and traffic channels in the system during the progress of a call. Knowledge of which channel the mobile is being moved to allows a prompt and non-disruptive assignment to the best beam. The control algorithms used will fall into two basic classes, one for initial acquisition of the best beam for a new call and one for tracking of the best beam when a call is in progress. It is anticipated that due to different multipath conditions the parameters within the control algorithms will vary for rural and urban cells. The determination of beam selection on the uplink is used to select the corresponding beam for the downlink. The information on a mobile's angular position, i.e. the present beam being used, together with real time tracking data from the tracking algorithm, involving range and angular velocity, is sent back, on the transceiver control bus via the BTS, to the BSC or MSC as required.

Figure 9:
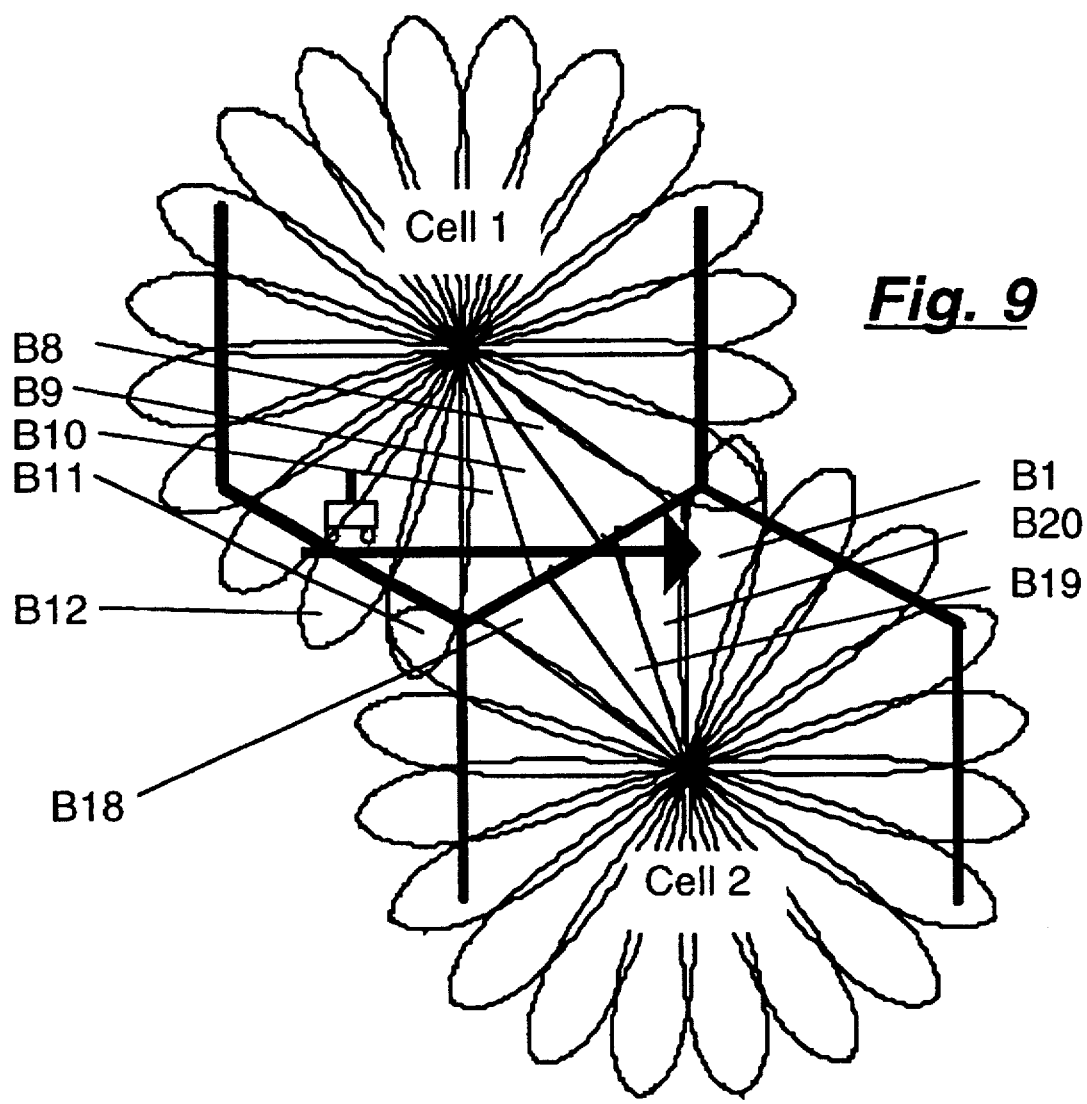
FIG. 9 illustrates schematically the use of assisted handover management.

This information can then be directed to the next cell into which the mobile will pass. The choice of this next cell is decided based upon polling of the surrounding cells, either by the mobile or by the base station controller. If it is by the base station controller, then the information from the smart antenna can be used to prioritise the polling sequence. This will enable the controller to reach the correct decision quicker, thus reducing the loading on the base station controller. Having chosen the correct cell, with a conventional omni receiver there is no advantage to knowing the approximate azimuth position of a mobile within that cell, however in a multiple beam antenna each beam must be monitored to find the one containing the mobile. It is therefore a great advantage to know the approximate beam into which a mobile will appear, so that the order in which the beams are analysed can be weighted to give priority to the known direction. FIG. 9 shows a mobile passing through cell 1 and into cell 2. The tracking algorithm of the smart antenna in cell 1 monitors the mobile's progress through beams 12, 11, 10 and 9 and can then give a quite accurate prediction to cell 2 that the mobile will appear in one of beams 18, 19 or 20.

The main and diverse receive switch matrices, operate under the control of the control processor, on information derived from the parallel receivers, and select the strongest and second strongest signals, respectively. These signals are then coupled by r.f. bus paths to the main and diverse ports of the bank of transceivers 84, one for each channel to be provided by the base station, where they are input to a maximal ratio combiner, of the type described in Mobile Communications Systems by J D Parsons et al, Blackie 1989. The transceivers are operated under the control of the base station controller 88, which also provides overall control for the switch matrix control processor 80.

The transceiver control bus 86 provides the communication link between the base station and the smart antenna. The communication link will be comprised of several buses, whose format will vary according to the type of base station to which the smart antenna is attached. Wherever possible the bus structure in the smart antenna will utilise the bus protocol of the base station. In the current implementation there are five bus types that carry the information outlined below:

1. Operations and maintenance that carries configuration, supervision and alarm management information for general operation purposes.

2. Operator controlled configuration information originating from either the BSC or the MSC.

3. Frequency values, timing information to identify position within the GSM frame structure, control information, beam power levels and mobile range. This is from the BTS to the smart antenna, with one bus per transceiver.

4. Information about the mobile, e.g. signal strength, direction, beam number. This is from the smart antenna to the BTS.

5. Signal strobes.

Figure 10:
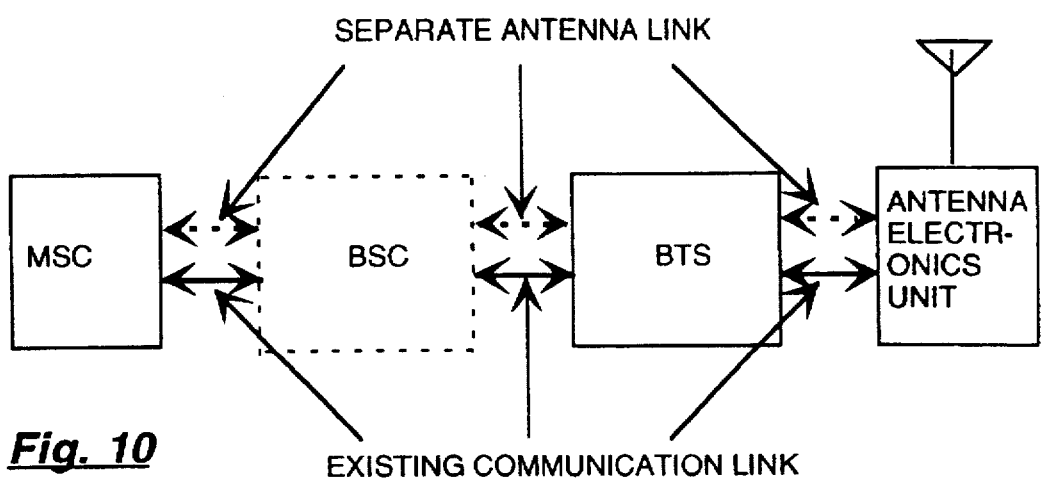
FIG. 10 is a block diagram of the communication link between the smart antenna and the rest of a cellular system.

The actual physical link used for communication between the smart antenna and the BSC and/or MSC will preferably be the existing signalling link, however a separate link as shown in FIG. 10 may also be used.

The key features of the invention can now be considered in more detail and contrasted with the conventional sectorised base station. It is not a single feature of the invention but rather the overall architecture (the functions and their precise disposition) which provides a practical and economic realisation of the narrow beam concept.

Considered from the network viewpoint, the smart antenna appears as an omni-directional cell site. Since any transceiver can be switched to any beam and hence look in any direction, there are no sectors. Thus, within the network all signalling and processing associated with sector to sector hand-offs are eliminated. Also the fact that transceivers can be used in any direction eliminates the trunking inefficiency of sectorised sites. These factors not only eliminate a significant load from the network but allow the antenna system to utilise effectively narrower beamwidths than would otherwise be possible.

An omni pattern is still necessary as a cellular radio base station is required to radiate the BCCh channel over its total arc of coverage, at maximum power, in all time slots. It may also be required to radiate other carriers at times with the full arc of coverage. In conventional base station configurations this is achieved by the use of a single omni or a tri-sectored antenna system with all carriers having the same coverage pattern. For a smart antenna arrangement, however, a different situation exists, in that traffic channels are radiated using selected narrow beams whilst the base station appears omni-directional to the cellular system. In order to achieve this the antenna arrangement must generate both directional and omni-directional patterns simultaneously. The smart antenna is made of a number of facets each covering a given sector, such that the total coverage is 360°. Each sector contains a number of beams which generate a sectoral pattern. This can be achieved using a beam set generated using, for example, a Butler Matrix. Such a set of beams when simultaneously excited by an r.f. carrier will produce a sectoral pattern with minimal ripple.

To produce an omni-directional pattern with minimum ripple it is necessary to place each facet such that their phase centres are coincident. This is clearly not possible. Practicality dictates that a minimum phase centre spacing of typically 5 or more wavelengths spacing is required.

Figure 11:
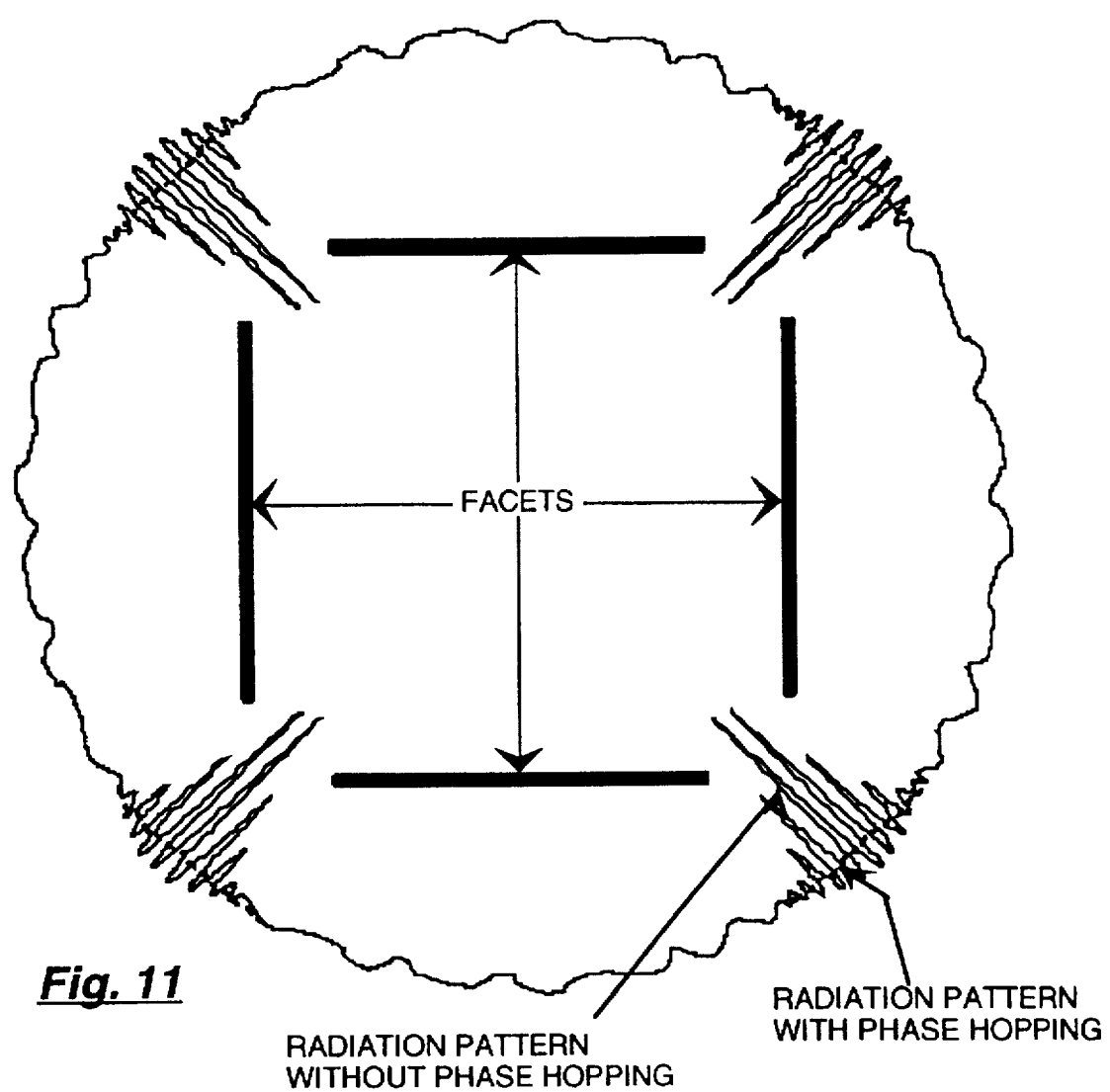
FIG. 11 illustrates pictorially the interfacet radiation pattern of a multifaceted system with and without the use of phase hopping.

When the phase centres are separated nulls are produced in the pattern whose position and depths are dependant on the phase centre separation, the rate of cut off of the individual sectoral patterns, electrical phasing errors and mechanical positioning tolerances. A pictorial representation of a typical null pattern at the interfacet region for a four facet mounting is shown in FIG. 11. For the 5 wavelength spacing required in a realisable smart antenna this first null assuming perfect phasing and mechanical alignment will occur some 5.6 degrees from the facet intersect and have a depth of some 6–7 dB that is more than can be tolerated. In many installations, e.g. those round buildings spacing of 100 or more wavelengths may be required leading to very deep nulls indeed.

This effect does not permit good omni-directional coverage to be obtained. Two possible solutions present themselves. First the cell could be sectored removing the requirement for omni-directional coverage. This could be on the basis of either quad sectoring using four BCCh channels or bi-sectored using two BCCh channels pointing in opposite directions. The second solution, that is to be discussed in detail, is known as phase hopping, it is this solution that is proposed for the generation of the omni directional pattern that will then have an effective (time averaged) amplitude ripple of some 2 dB. FIG. 11 also shows, overlaid on the null pattern, a thick dashed line illustrating the improvement obtained when using phase hopping.

Figure 12:
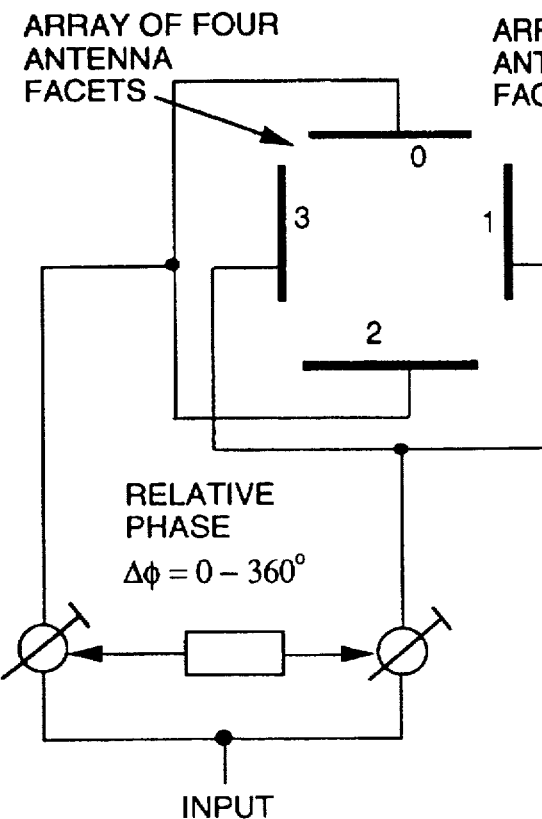
FIGS. 12a–12c are diagrams of different embodiments of phase hopping.
Figure 12:
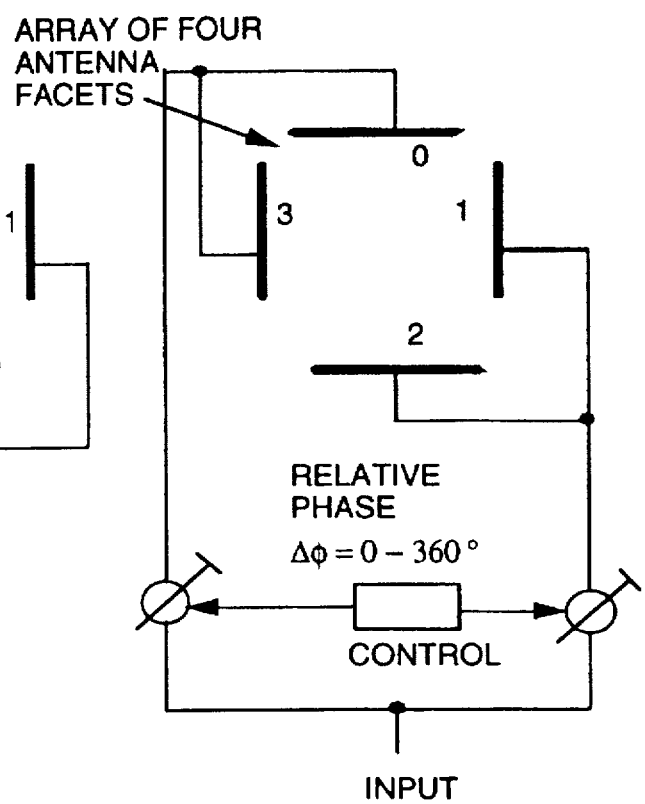
Figure 12:
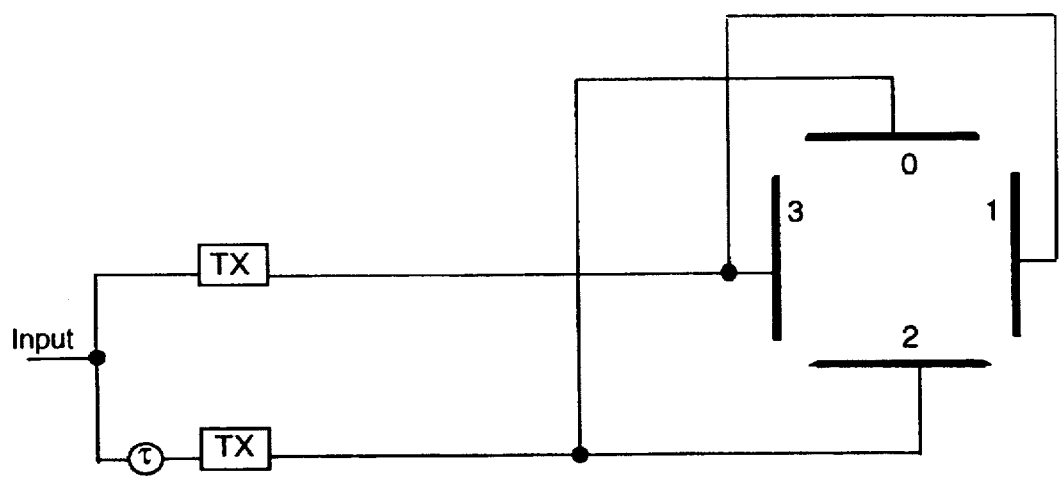

With phase hopping the array of facets are fed as two or more groups with no two adjacent facets being fed from the same output of the phase hopping module. An example of such a phase hopping module is shown in FIG. 12a. In this case the array consists of four facets each covering a 90 degree sector. The diametrically opposite facets are connected to the same feed via a power splitter. Each of these pairs of feeds is moved in phase relative to each other, by the use of a phase shifter. This can be achieved by a single 360 degree phase shifter in one arm. Alternatively two lesser value phase shifters capable of providing the full 360 degree relative phase shift placed one in each arm could be used. This latter system in practice will give a better amplitude balance.

The phase shifters are controlled in such a way as to vary the relative phase of the facets through 360 degrees, in a suitable time scale for the system in question to integrate the received energy and maintain a best average link. In the case of the GSM/DCS1800 type wave forms this is perhaps best achieved by stepping the phase on a time slot by time slot basis using say 16 steps controlled in a pseudo random manner. The use of a stepped wave form in this case prevents degradation of the phase trajectory response that would occur for a linear phase shift. The randomisation of the phasing is to prevent any cyclic interference with the various GSM message formats that occur on a multi-frame basis.

The effective loss of such a system is a maximum of approximately 2dB relative to the optimally combined signals when both signals have equal amplitude, being a lesser value for unequal amplitude signals. With such a system, if the crossover level between facets is at −4 dB, then a virtually uniform averaged omni pattern will result.

An alternative method that will be viable in certain situations is shown in FIG. 12b. This method involves phase hopping between adjacent facets on one of the diagonals, e.g. the interfacet region between 1 & 2 and between 3 & 0, but not between 0 & 1 or 2 & 3. This can only be achieved if the facet phase centres of the latter two pairs (0 & 1 and 2 & 3) are sufficiently close together to enable a good beam pattern to be obtained at this non-cycled interfacet region.

A method that will in effect phase cycle the interfacet region is shown in FIG. 12c. This method involves the use of transmit diversity, the main and diverse ports of the transmitters being connected to adjacent facets. The diverse port contains the same signal as the main port but delayed in time. With GMSK modulation, as used in GSM and DCS1800, alternate bits will have an offset from the previous bit equal to a multiple of 90°. This will provide the facets with random 90° phase changes, a form of phase hopping.

The position of the amplifiers 50, 52 at the top of the mast or building is the key to the whole architecture. Firstly the concept of switching the transmitters to any beam is impractical unless it can be achieved without generating intermodulation products, or at least maintaining them at a very low level. This is not possible if one were to attempt to switch the power levels, which can be as high as 50 watts, at the transceiver outputs. It is necessary to switch before power amplification. Secondly if power amplification takes place at the foot of the mast or building, the r.f. feeder cables must be very low loss and become large and expensive. This would be a significant practical limitation on the number of beams one could have in a system.

By situating the amplifiers at the top of the mast or building the above problems are solved. However, the precise position in the architecture within the antenna electronics unit is still critical. Also since the amplifiers are at the top of the mast they must be extremely reliable and failures should not produce catastrophic degradation in system performance.

The positioning of the single carrier power amplifiers 52 prior to the diplexers 48 that are prior to the azimuth beamformer provides an excellent compromise between the above factors and cost. If a complete single carrier power amplifier was to fail (which is unlikely because of their simple hybrid design that leads to high reliability) the main effect would be a reduction in traffic capacity in only one beam. The omni pattern would remain unaffected as this takes precedence in amplifier allocation via the switch matrices. The use of single carrier amplifiers reduces the problems with intermodulation products. Positioning the diplexers prior to the azimuth beamformer requires fewer diplexers that proves to be a more cost effective solution. It also simplifies the control of the amplitude ripple across the beams required for the omni pattern.

A potential disadvantage of the invention is that a relatively large antenna aperture, in terms of wavelengths, is needed to produce the narrow beams. If the antenna aperture were very large this could create aesthetic and structural problems, due to wind loading, etc., in some sites. This potential disadvantage is overcome by using the same antenna array 40 for transmit and receive. In this way the outline of the antenna, for reasonable beamwidth, is less than that of many conventional cell sites.

Thus the diplexing of transmit and receive through the common aperture is a key feature of the architecture.

This type of antenna also has the potential disadvantage that it does not readily lend itself to the doubling of antenna elements required to gain spatial diversity in the receive path. Spatial diversity is the most common method currently in use to overcome the problems of multipath. The smart antenna can overcome this problem by using angular diversity, due to the fact that it has a separate incoming signal in each one of its multiplicity of beams. These can be compared with the two largest signals selected, in the receive switch matrices, and hence diversity can be maintained.

Figure 13:
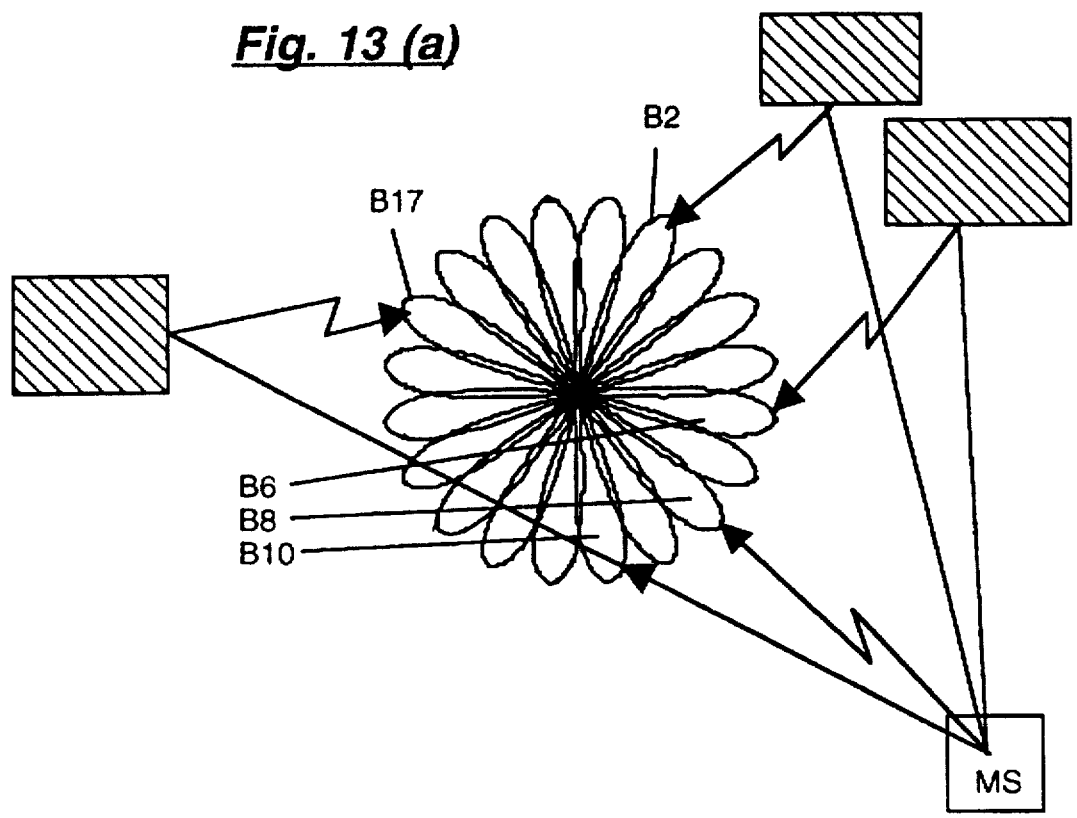
FIGS. 13a and 13b illustrate schematically the principles of angular diversity.
Figure 13:
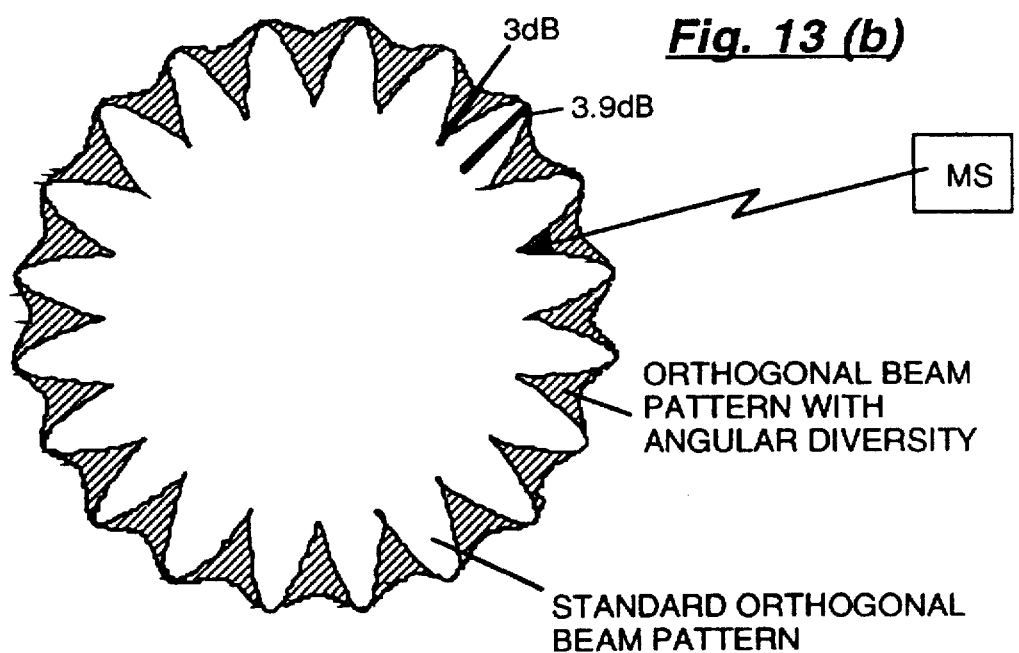

The advantages gained from this invention are twofold, depending on whether the cellular base transceiver station is sited in an area of high or low multipath. In a high multipath environment the antenna receives strong scattered signals from widely separated angles as shown in FIG. 13a. The antenna will select the two strongest signals, regardless of in which beam they appear, these could for example be beams B8 and B17 or any combination of the beams shown. These two signals can then be routed to the main and diverse pods of any maximal ratio combiner to maximise receive power and give diversity gain to the system.

In a low multipath environment, where strong scattered signals are not as common, the two strongest signals will normally be in adjacent beams, as shown for the mobile station in FIG. 13b. The two strongest signals will again provide the inputs to a maximal ratio combiner as for the high multipath case. Due to the fact that the beams are orthogonal the resultant signal will in effect "fill in" most of the cusp between the two beams. Hence in a low multipath environment the ripple in the omni pattern will be reduced from approximately 3.9 dB to the order of 0.9 dB, as shown by the shaded area in FIG. 13b, resulting in a possible 3 dB gain in received signal power.

Considering the improved coverage pattern shown in FIG. 13b, this can also be achieved on the transmit side by the use of dual transmit beams. When a mobile passes through the cusp, as shown in FIG. 13b, the switching system will ensure that the signal is fed to the two adjacent beams. Dual transmission will only occur if the smart antenna predicts the mobile to be passing through the cusp or the received signal from the mobile is very weak. The use of beam splitters to feed the same signal to all beams reduces the complexity of the implementation. The two beams can be fed either in phase or in quadrature depending upon the circumstances. The two beams can be fed at full power in phase, as shown in FIG. 14a, if there is no ERP limitation or if the smart antenna is operating at least 3 dB below the limit. This will result in a 3 dB improvement in peak signal power with the 3dB cusp point at the previous peak level, as shown by the hatched area in FIG. 14c. If the system is operating close to the ERP limit then this method can only be used if the power level fed to the two beams is reduced and will not eliminate cusping completely. A preferred solution in this instance is to feed the two beams in quadrature, as shown in FIG. 14b. This will have the effect of filling the cusp, as shown by the solid area in FIG. 14c, whilst not increasing the peak radiated power level.

Figure 15:
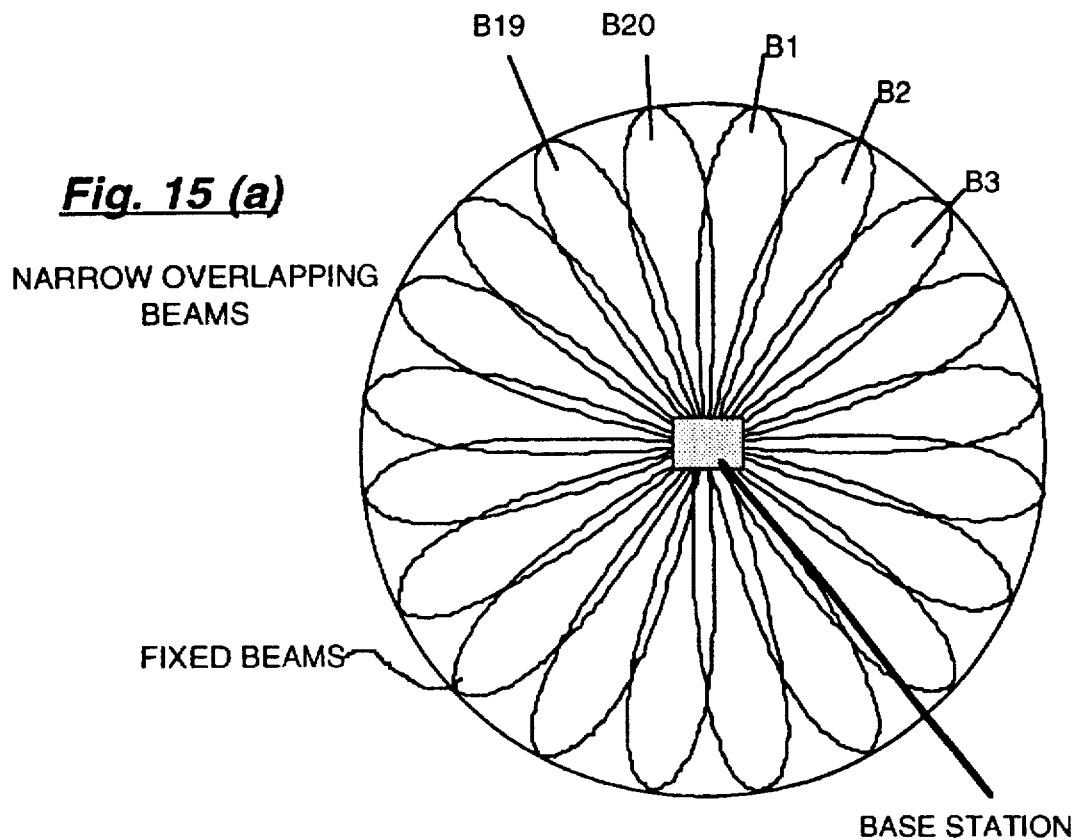
FIGS. 15a–15c illustrate the operation of a multiple narrow beam base station.
Figure 15:
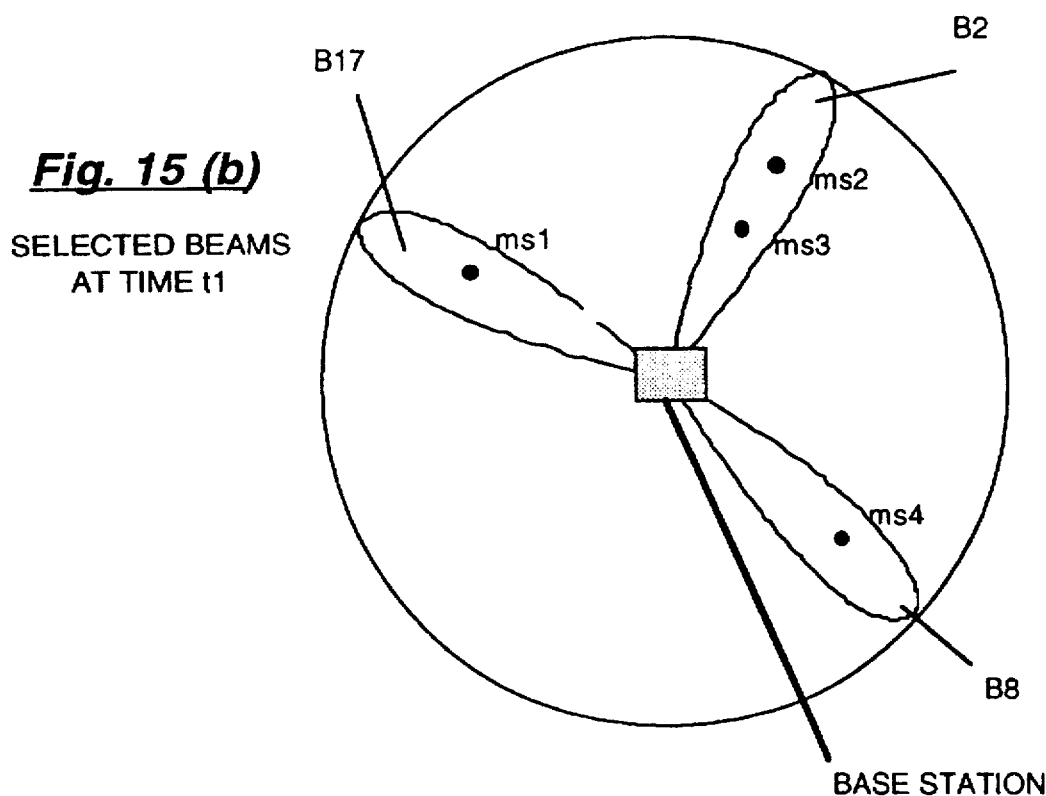
Figure 15:
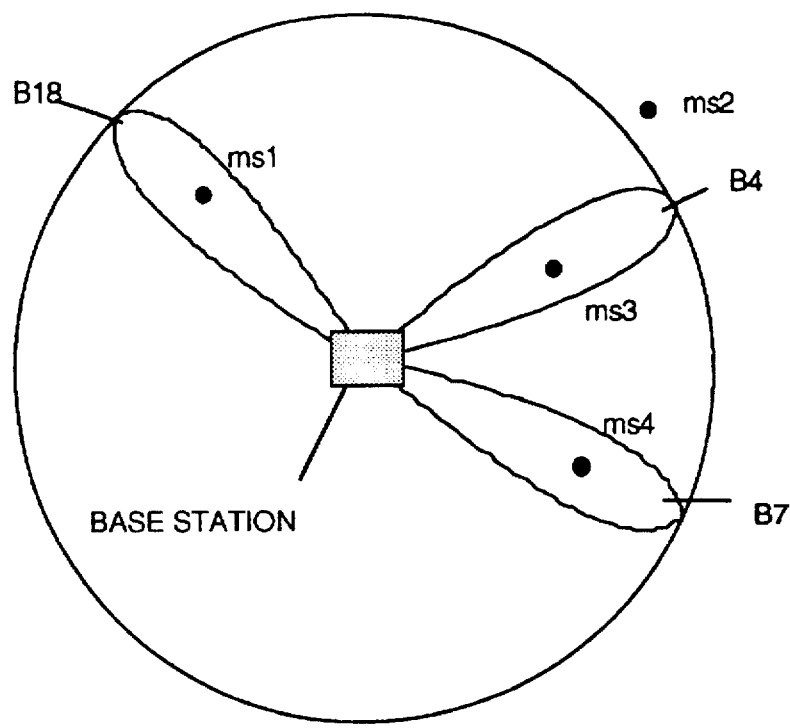

FIG. 15 illustrates the system operation. FIG. 15a shows the concept of a multiplicity of narrow, overlapping beams covering the cell area surrounding the base station. The beams are referenced b1-b20. FIG. 15b shows how, at time $t_1$ four mobile stations ms1-ms4 are served by beams b2, b8 and b17. Beam b2 serves two mobile stations ms2 and ms3 at this time. As the mobile stations move geographically in relation to the base station, at time $t_2$ beam b18 now serves mobile station ms1, b4 serves ms3 and b7 serves ms4. Mobile station ms2 has at time $t_2$ moved out of the cell coverage of this base station and will now be served by an adjoining base station (not shown).

The use of cell shaping attenuators enables the contour of the ideal cell illustrated in FIG. 15a to be altered. This feature has several advantages for the cell planner and the operator; such as the reduction of handovers and lower interference levels, by removing large areas of overlap; flexibility of base station location; avoidance of interference sources and congestion management, each of which will be described individually.

Figure 16:
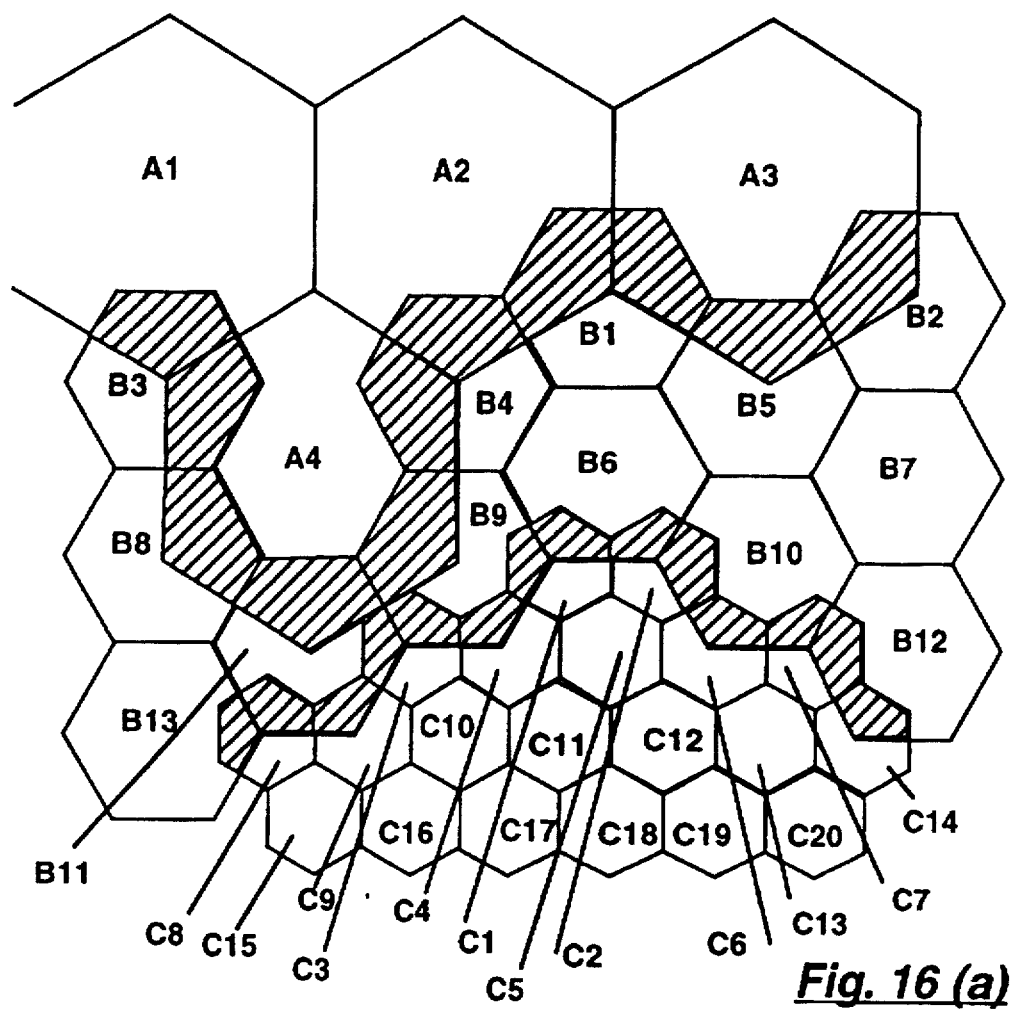
FIGS. 16a and 16b illustrate schematically the reduced overlap at differing cell radii boundaries using cell dimensioning.
Figure 16:
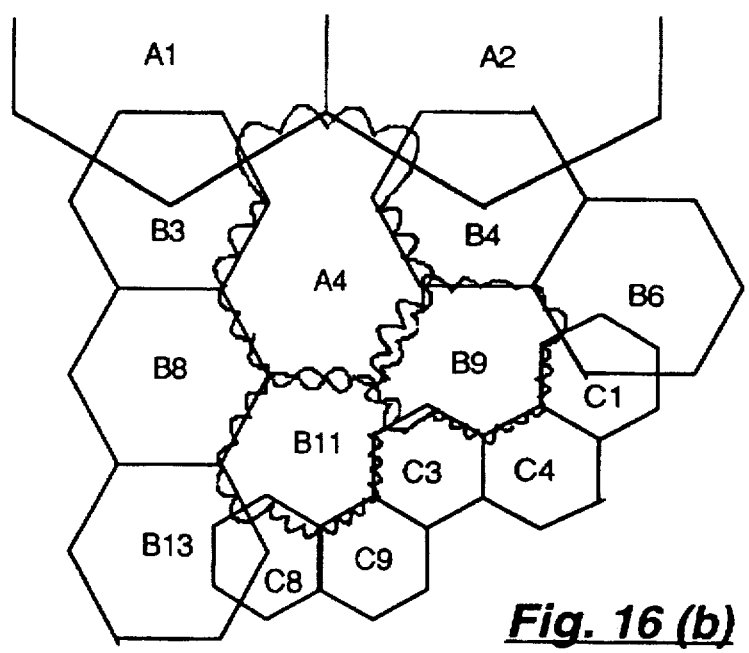

Cell planners usually use a hexagonal grid to obtain best coverage and interference reduction. In rural areas cell size will be limited by the transmit power of the mobiles and base stations, however in urban areas, cells are also likely to be limited by co-channel interference. Cell planners therefore have to be able to match together cells of different sizes at cell split boundaries. FIG. 16a illustrates a typical cell layout, using three cell sizes and the shaded areas indicate the regions of overlap. It is obvious that there are quite large areas of overlap, along the boundaries between regions of different cell sizes. Areas of overlap can also exist between cells of the same size due to shadowing effects and the canyon effect of streets in large cities, etc.

Large areas of overlap can cause problems with interference and with a much higher rate of handover, for mobiles, between cells, which can lead to a heavy loading on the network. FIG. 16b shows that by adjusting the power levels in each of the beams for cells A4, B9 and B11 the areas of overlap can be greatly reduced. This will reduce the conflict about which base station is handling a mobile and the interference caused by overlapping coverage areas. It will also result in a reduction in power consumption for individual cells.

With conventional base station antennas, once the cell grid has been decided, the operator has little flexibility in where the base stations can be sited. FIG. 17a shows that to get a coverage of an approximate radius R a conventional BTS must be sited close to the centre of the cell. The present invention, however, due to its cell dimensioning capability allows the operator a lot more flexibility in the siting of the base station, as can be seen in FIG. 17b. This can result in a financial saving to the operator, by allowing the choice of cheaper sites.

This invention also has the means to manage the coverage area around potential sources of interference (or where the BTS would be the interferer) with the minimum loss of mobile coverage. By attenuating just one, or several adjacent beams, it is possible to put a notch in the antenna footprint, effectively acting as an interference cancellor in a particular direction, as shown in FIG. 18.

Figure 19:
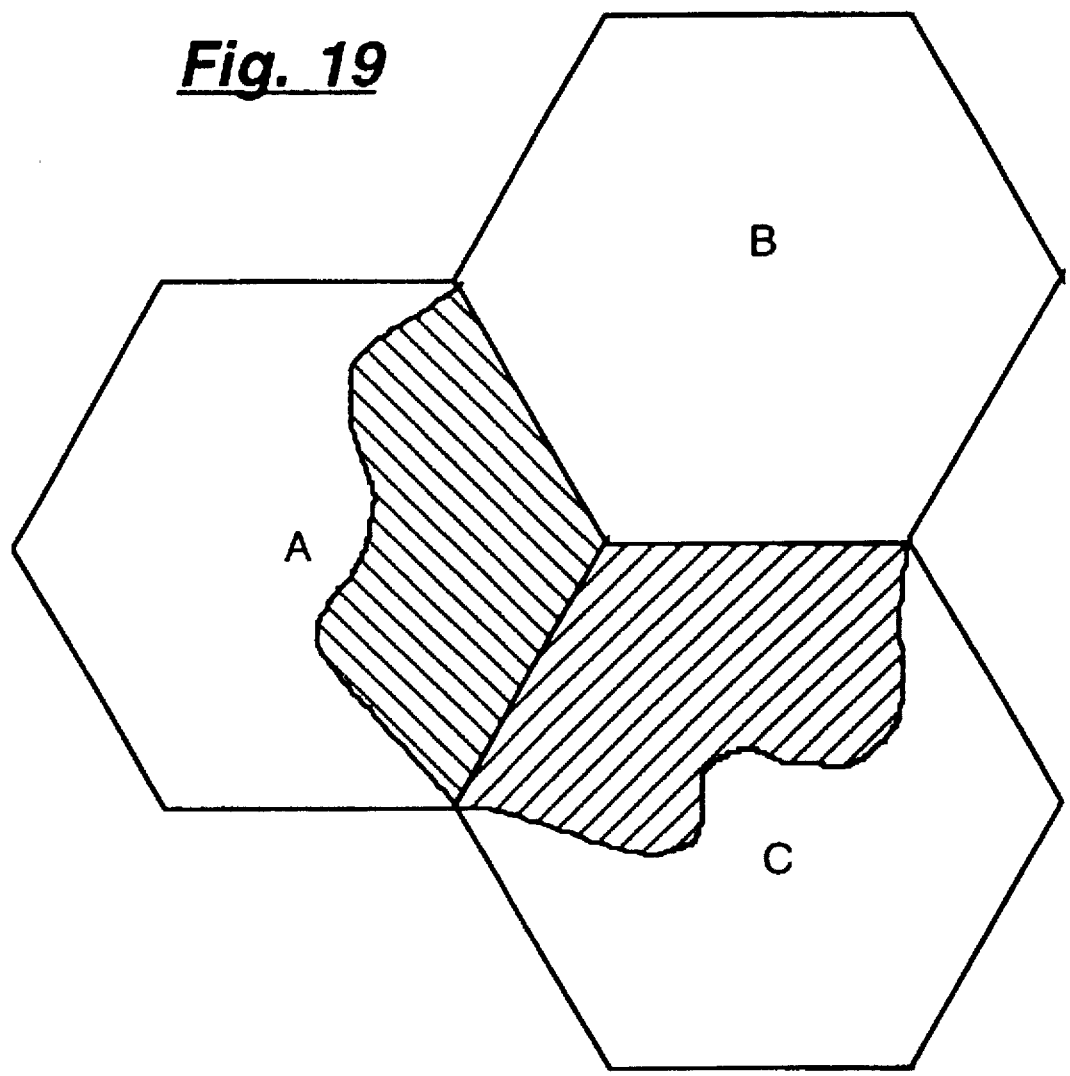
FIG. 19 illustrates schematically the use of cell dimensioning to avoid congestion.

Cell Dimensioning can also be used to dynamically control periodic congestion in cells. Considering FIG. 19, if cell A always experiences much higher traffic density during the morning period, for example, then cells B and C can be increased to reduce the size of cell A (the shaded area), hence relieving some of the congestion. Later in the day the congestion may then appear in cell C and cells A and B can be increased to lower the traffic density in cell C. Periodic adjustments in the cell boundaries can be achieved wherever the traffic density fluctuates in a known manner during a fixed period of time. Cell sizes can only be increased in the limit of the transmit power of the antenna, or an imposed ERP limit.

This feature can also be used to enable maintenance work to be carried out when the cell utilisation is low. One cell can be switched off and its neighbouring cells will increase their size to cover the cell, without any loss of coverage.

I claim:

1. A non-sectorised telecommunications base station antenna arrangement comprising:

a plurality of layered antenna arrays each capable of forming a multiplicity of separate overlapping narrow beams in azimuth, the arrays being positioned such that the beams provide a coverage in azimuth wider than each array; and in which the antenna arrangement includes means for splitting the transmission output of a given transceiver into two signals prior to transmission power amplification and transmitting said signals in two adjacent narrow overlapping means, the split signals being transmitted in quadrature in the two adjacent beams.

2. A non-sectorised telecommunications base station antenna arrangement comprising:

a plurality of layered antenna arrays each capable of forming a multiplicity of separate overlapping narrow beams in azimuth, the arrays being positioned such that the beams provide a coverage in azimuth wider than each array;

azimuth beamforming means for each array;

a plurality of r.f. transceivers each for transmitting and receiving r.f. signals for one or more calls;

switching matrix means for connecting each transceiver with one or other of the arrays via the beamforming means; and control means for controlling the switch matrix means whereby a particular transceiver is connected to a particular array, via the beamforming means, to exchange r.f. signals with a remote station located in the area covered by the antenna wherein the antenna includes means for splitting the transmission output of a given transceiver into two signals prior to transmission power amplification and transmitting said signals in two adjacent narrow overlapping beams.

3. An antenna arrangement as claimed in claim 2 wherein the split signals are transmitted in quadrature in the two adjacent beams.

4. A method of operating a non-sectorized telecommunications base station antenna arrangement in a transmission mode, the arrangement comprising: a plurality of layered antenna arrays each capable of forming a multiplicity of separate overlapping narrow beams in azimuth, a plurality of r.f. transceivers each for transmitting and receiving r.f. signals for one or more calls, switching matrix means, and control means; the arrays being positioned such that the beams provide a coverage in azimuth wider than each array; the method comprising the following steps:

splitting the transmission out put of a given transceiver into two signals prior to transmission power amplification; and transmitting said signals in two adjacent narrow overlapping beams, whereby cusping between two adjacent beams is reduced.

5. A method according to claim 4 wherein, for a given signal received from a mobile, including the further steps of determining the best beams to be selected on the uplink by measuring the quality of of the received signal strength from the mobile; and selecting the antennas which would provide the best adjacent beams for a given channel on the downlink.

6. A method as claimed in claim 4 wherein the split signals are transmitted in quadrature in the two adjacent beams.

7. A method of operating a non-sectorized telecommunications base station antenna arrangement in a receive mode, the arrangement comprising: a plurality of layered antenna arrays each capable of forming a multiplicity of separate overlapping narrow beams in azimuth, a plurality of r.f. transceivers each for transmitting and receiving r.f. signals for one or more calls, switching matrix means, and control means; the arrays being positioned such that the beams provide a coverage in azimuth wider than each array; the method comprising the following steps:

selecting the two strongest signals, regardless of in which beam they appear; and routing these received signals to main and diverse ports of any maximal ratio combiner to maximize receive power whereby to provide diversity gain to a cellular communication system.

8. A method of operating a non-sectorized base station arrangement in a receive mode, the arrangement comprising: a plurality of layered antenna arrays each capable of forming a multiplicity of separate overlapping narrow beams in azimuth, a plurality of r.f. transceivers each for transmitting and receiving r.f. signals for one or more calls, switching matrix means, and control means; the arrays being positioned such that the beams provide a coverage in azimuth wider than each array; the method comprising the following steps:

selecting the two strongest signals from two adjacent beams; and routing these received signals to main and diverse ports of any maximal ratio combiner to maximize receive power whereby to provide diversity gain to a cellular communication system and effect fill in of a cusp between the two beams.

* * * * *